TELEPRINTER EXCHANGE SYSTEM INCORPORATING STORAGE DEVICES

Filed Jan. 20, 1954 20 Sheets-Sheet 1

Inventors
E. P. G. WRIGHT
D. A. WEIR
J. RICE
By Robert Harding Jr.
Attorney

Inventors
E. P. G. WRIGHT
D. A. WEIR
J. RICE
By Robert Harding Jr.
Attorney

Sept. 13, 1960 E. P. G. WRIGHT ET AL 2,952,731

TELEPRINTER EXCHANGE SYSTEM INCORPORATING STORAGE DEVICES

Filed Jan. 20, 1954 20 Sheets-Sheet 3

Inventors
E. P. G. WRIGHT
D. A. WEIR
J. RICE

By Robert Harding Jr.
Attorney

Sept. 13, 1960 E. P. G. WRIGHT ET AL 2,952,731

TELEPRINTER EXCHANGE SYSTEM INCORPORATING STORAGE DEVICES

Filed Jan. 20, 1954 20 Sheets-Sheet 4

Inventors
E. P. G. WRIGHT
D. A. WEIR
J. RICE
By Robert Harding Jr.
Attorney

Inventors
E.P.G. WRIGHT-
D.A.WEIR-
J.RICE
By Robert Harding Jr.
Attorney

TELEPRINTER EXCHANGE SYSTEM INCORPORATING STORAGE DEVICES

Filed Jan. 20, 1954 20 Sheets-Sheet 6

Inventors
E. P. G. WRIGHT
D. A. WEIR
J. RICE
By Robert Harding Jr.
Attorney

TELEPRINTER EXCHANGE SYSTEM INCORPORATING STORAGE DEVICES

Filed Jan. 20, 1954 20 Sheets-Sheet 7

Inventors
E. P. G. WRIGHT
D. A. WEIR
J. RICE
By Robert Harding
Attorney

Inventors
E. P. G. WRIGHT
D. A. WEIR
J. RICE
By Robert Harding Jr.
Attorney

Sept. 13, 1960 E. P. G. WRIGHT ET AL 2,952,731

TELEPRINTER EXCHANGE SYSTEM INCORPORATING STORAGE DEVICES

Filed Jan. 20, 1954 20 Sheets-Sheet 9

Inventors
E. P. G. WRIGHT
D. A. WEIR
J. RICE
By Robert Harding Jr.
Attorney

TELEPRINTER EXCHANGE SYSTEM INCORPORATING STORAGE DEVICES

Filed Jan. 20, 1954 20 Sheets-Sheet 10

Note: IBT and OBT are the "1" and "0" Controls respectively received from the Booking Track Read Circuit.

Inventors
E. P. G. WRIGHT
D. A. WEIR
J. RICE
By Robert Harding Jr.
Attorney

Sept. 13, 1960 E. P. G. WRIGHT ET AL 2,952,731

TELEPRINTER EXCHANGE SYSTEM INCORPORATING STORAGE DEVICES

Filed Jan. 20, 1954 20 Sheets-Sheet 11

Inventors
E. P. G. WRIGHT
D. A. WEIR
J. RICE
By [signature]
Attorney

Inventors
E. P. G. WRIGHT
D. A. WEIR
J. RICE
By Robert Harding Jr.
Attorney

Sept. 13, 1960 E. P. G. WRIGHT ET AL 2,952,731

TELEPRINTER EXCHANGE SYSTEM INCORPORATING STORAGE DEVICES

Filed Jan. 20, 1954 20 Sheets-Sheet 13

Inventors
E. P. G. WRIGHT-
D. A. WEIR-
J. RICE
By Robert Harding Jr.
Attorney

NOTE:- 1ST & OST ARE THE "1" & "0" CONTROLS FROM THE STORAGE TRACK READ CIRCUIT, VIA THE APPROPRIATE SELECTOR GATE & G1505.

Inventors
E. P. G. WRIGHT-
D. A. WEIR-
J. RICE
By Robert Harding Jr.
Attorney

TELEPRINTER EXCHANGE SYSTEM INCORPORATING STORAGE DEVICES

Filed Jan. 20, 1954 20 Sheets-Sheet 15

Inventors
E. P. G. WRIGHT
D. A. WEIR
J. RICE
By [signature]
Attorney

Note ⊏ Indicates a Common to all Operators, Corresponding Controls will be used on Respective Gates.

G1507-G1511 Are Current Control Gates

Inventors
E. P. G. WRIGHT
D. A. WEIR
J. RICE
By [signature]
Attorney

SCHEMATIC OF ELECTRONIC TELEGRAPH SWITCHING.

Inventors
E. P. G. WRIGHT
D. A. WEIR
J. RICE
By Robert Harding Jr.
Attorney

Inventors
E. P. G. WRIGHT-
D. A. WEIR-
J. RICE
By [signature]
Attorney

Inventors
E. P. G. WRIGHT·
D. A. WEIR·
J. RICE
By Robert Harding Jr.
Attorney

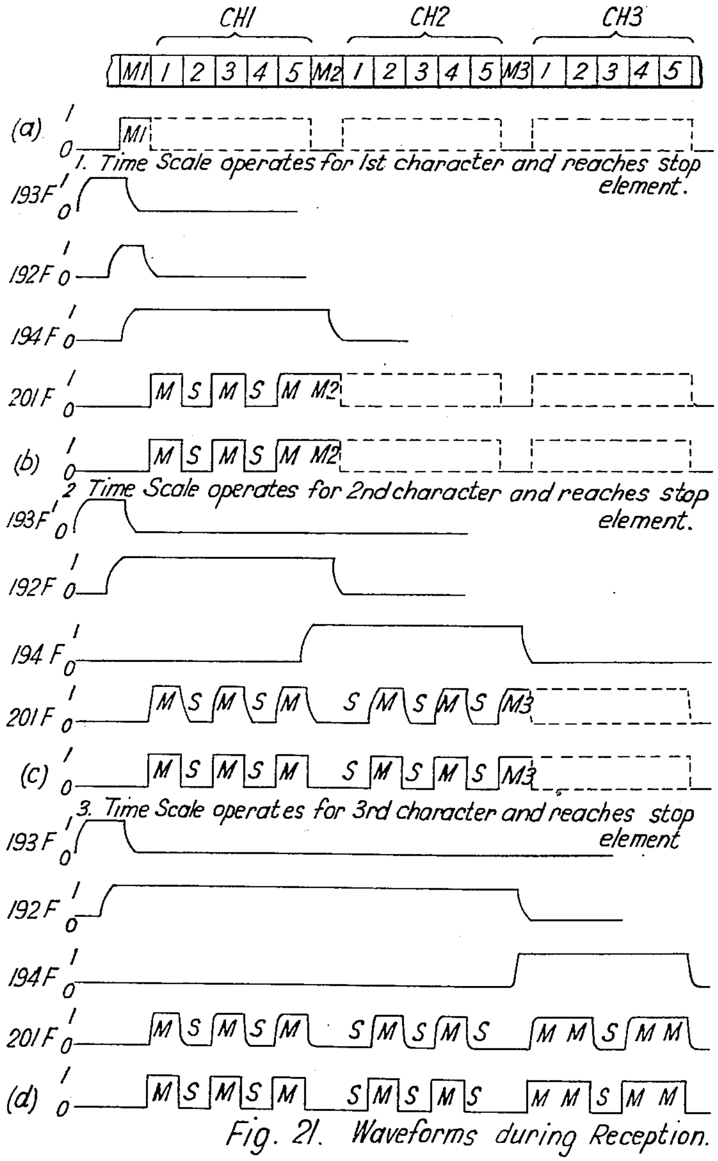
Fig. 21. Waveforms during Reception.
Inventors
E.P. G. WRIGHT-
D. A. WEIR-
J. RICE
By Robert Harding Jr.
Attorney

United States Patent Office 2,952,731

Patented Sept. 13, 1960

2,952,731

TELEPRINTER EXCHANGE SYSTEM INCORPORATING STORAGE DEVICES

Esmond Philip Goodwin Wright, Donald Adams Weir, and Joseph Rice, London, England, assignors to International Standard Electric Corporation, New York, N.Y.

Filed Jan. 20, 1954, Ser. No. 405,117

Claims priority, application Great Britain Jan. 23, 1953

14 Claims. (Cl. 178—2)

This invention relates to electrical systems for the storage and retransmission of intelligence.

The invention is particularly suitable for use in the switching of telegraph messages using start-stop teleprinter code, but is not limited thereto.

In conventional telegraph switching systems, and in certain industrial telecommunication systems, including electronic calculators, the necessity arises for storing teleprinter messages for periods of time, which may be long or short, and for retransmitting the messages with or without modifications, and with or without a rearrangement of order, and to one or more destinations.

Systems for effecting this are well known and comprise such devices as paper tape in which signals representing incoming messages may be punched and magnetic tape in which the incoming signals may be stored by magnetic changes in the magnetic material of the tape.

In teleprinter switching systems as such, i.e. public and private networks for the transmission of telegrams, the completely automatic handling of connections is by no means as straightforward as in telephone switching systems, and direct subscriber-to-subscriber connection the exception rather than the rule. In these circumstances, modern developments have tended towards a certain amount of automatic operation under the control of an operator with improvements directed towards increased operator efficiency, such a modern system being the well-known "push-button" system, based on typing repreforator storage with auto-transmitter units.

In this system the station lines or tails are usually operated on a full duplex basis and, to ensure that traffic may continue to flow into the switching centre in spite of transient delays in cross-office connection to the required destination, the incoming tails terminate on typing reperforator/auto transmitter units. Frequently the interswitching centre junctions and outgoing tails are headed by a reperforator/auto transmitter unit, so that storage may take place upon the outgoing side of the centre.

Interconnection is under control of an operator, called in when the message has been received into the incoming store, the operator then actuating a push button in accordance with the destination heading the message. The incoming storage units are housed in suites, the operator answering a signal on the particular unit when the interconnection is to be performed.

Such a system inevitably involves a considerable quantity of mechanical equipment which requires skilled maintenance and which has a limited life expectation. It also involves the large scale usage of high quality paper tape. Again, by virtue of the mode of presentation of destination information, the operator must move about from storage unit to storage unit to accomplish connection and so nevertheless, impair efficiency. However, it requires only very simple switching equipment and provides almost unlimited storage.

An object of the invention, therefore, is the provision of a teleprinter exchange system incorporating storage devices of the kind which are now coming into general use in which intelligence is recorded by creating internal strains in the material of the store and in which stored intelligence is read out by detecting the state of strain in the material.

According to one feature of the invention equipment for storing intelligence comprises a plurality of signal paths over which items of intelligence are received, a plurality of temporary first stores, one for each such signal path and each adapted to store temporarily and in turn successive portions of an intelligence item received over its associated signal path, a plurality of main second stores each available in common to all said signal paths, a control circuit adapted to respond to a signal record in association with an intelligence item in a first store and means under the control of said control circuit for sequentially allocating to a first store a plurality of free second stores for the transfer and storage of successive portions of the intelligence item.

According to a further feature of the invention, in a telegraph exchange system in which incoming messages are stored and are later retransmitted in an arbitrary order based on criteria, such as priority ratings, means is provided for automatically extracting supervisory information such as priority rating and message identity from incoming messages received over a message channel and passing to a message storage means. A control circuit automatically directs such extracted information to a booking store and automatic testing equipment selects from said booking store supervisory information for different messages in an order determined by the desired criteria for use in controlling the outgoing transmission of messages.

In the embodiment of the invention about to be described, the form of temporary storage used is a magnetic drum or disc such as has been used in electrical computers as a storage device. Magnetic drum storage uses a rotating cylinder whose surface is capable of registering two-condition signals as two conditions of magnetisation impressed by a writing head. The stored information is recoverable when required by a reading head, influenced by the two conditions of magnetisation previously recorded. The two heads may be combined but achieve their separate objectives; they are not in contact necessarily with the cylinder.

A drum may have many different write-read heads each of which is associated with a particular annular ring, termed a track. Ten or more such tracks may be accommodated per inch. An elementary signal occupies approximately .020" of the periphery of the drum.

It will be apparent that many elementary signals may be stored dependent only upon the dimensions of the drum. For instance, a 10 inch diameter drum of 16 inches length may store over 1500 elementary signals per track and accommodate 160 tracks. Relating this more directly to the present consideration, each track may store 250 characters (assuming 6 element storage per character), or 50 five letter words; approximately ¾ minutes recording at a speed of 50 bauds. By employing several tracks for storage one after the other, any maximum storage time required may be catered for.

In the application of the magnetic drum to relay storage several methods for storage, of incoming traffic are possible. The particular incoming circuit may terminate on a group of "$n$" tracks which together provide for the maximum storage time required. The message or messages would be recorded on the tracks in sequence, reverting to the first track as the messages are cleared. The writing and reading circuits would be separately controlled, of course, to allow writing upon one track while reading occurred from another.

Such a system may be criticised because if each tail is catered for individually, more tracks would be required than if the tracks were held in a common group or groups, tracks being taken into use when free and as required. This method of usage would allow each message rather than each tail to acquire storage space, thus relieving delays which might occur due to inability to forward one message of a group. This would also allow speedier priority working during periods of congestion when priority becomes more important. Of course, this system would involve switching arrangements to allow the association of the free track with a message-bearing tail, as well as switching equipment to the outgoing circuits.

Between these two arrangements of non-common and all common tracks is a combination of the two in connection with which the present invention will be described. In this system each tail has an associated line track for recording incoming messages, but as the line track is filled or messages are completed, the contents are transferred to a common group of storage tracks.

The method in which a common storage track is associated with a message is attractive because, by storing discrete messages, the need for separate outgoing storage can be eliminated. This reduces the storage requirements, and hence the number of tracks required.

The problem of storage of outgoing traffic is very similar to that encountered on incoming traffic although priority requirements may then require the usage of tracks on a non-common basis.

Drum storage of itself provides no visible destination information so that other arrangements must be provided. One such is to group tracks for a particular operator and arrange that when a message has been received the operator is signalled. In response, she requests the destination information by key operation and the data is printed on a tape teleprinter included in her position. Acting upon the information she depresses the requisite routing key or keys and so effects cross-office connection.

If the cross-office route is not available she may hold the message in suspense while accepting other messages and try at appropriate intervals to effect the transit.

Assuming that the interconnection was established, the transfer from incoming to outgoing storage would take place at very high speed, such as 50,000 bauds, and thus occupy only a few milliseconds, the connection dropping out upon detection of an end-of-message signal.

When the operator requests the destination information the drum would not destroy the record in any way so that the full message would be transferred to the outgoing store.

The high, cross-office transfer rate reduces the number of occasions of "busy" and also reduces the average delay of a message when comparison is made with conventional systems.

The invention will be particularly described with reference to the accompanying drawings illustrating a preferred embodiment comprising magnetic drum equipment for receiving and storing teleprinter messages and making a booking entry relative to such messages. The booking entries may be made available to an operator who will intervene in the further disposal of the messages. Alternatively, a fully automatic process for the passage of the messages may be employed, only the booking entry remaining stored as a permanent record of the "transaction."

Figure 16A:
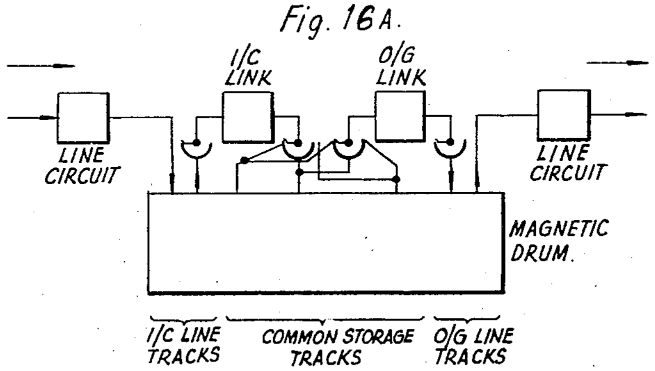
Figure 16:
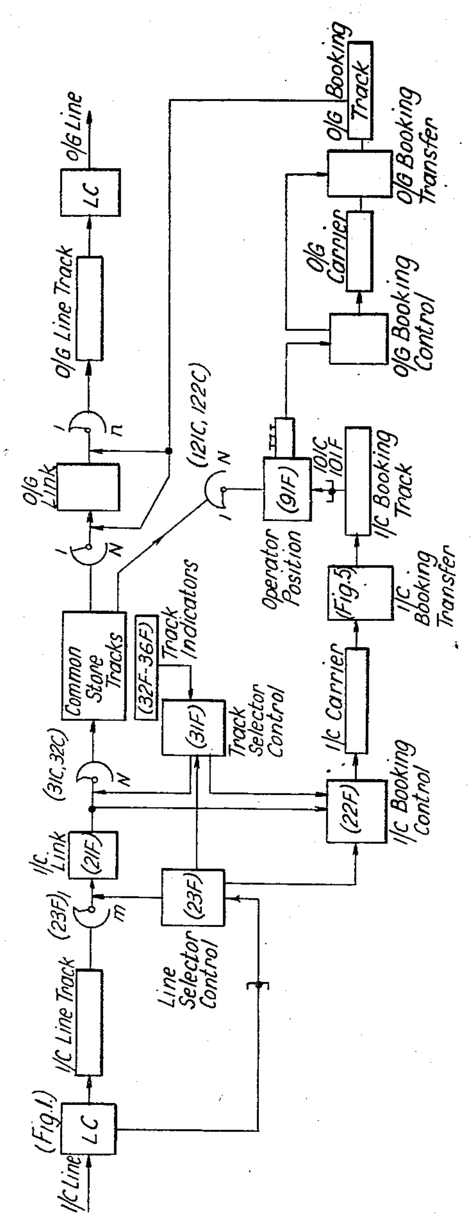

Figs. 16 and 16A comprise an overall block schematic of an electronic teleprinter switching centre;

Figs. 17–20 comprise circuits for receiving teleprinter signals from an incoming line; and Fig. 21 shows illustrative waveforms and register operations for the reception of a 3-character message.

Before passing on to a detailed description of the circuitry, it is necessary to explain the electronic tools used, and the drawing conventions employed to express these tools and to render the drawings functionally clear without irrelevant circuit detail.

The equipment operates under the control of pulse trains derived from the magnetic drum itself, and is thus self-synchronous. Additional to the tracks on which intelligence is stored there is a track having a recording per element position of all stoage tracks. Associated with this track, known as the "element" or "clock" track, there is a reading head known as the "clock" head from which there is derived a pulse-per-element position. By means of delay circuits, this clock pulse cycle is used to derive a set of three, time-spaced, narrow pulses per element pulse. These are known as the *t*1, *t*2, *t*3 pulses, and are shown in Fig. 8.

In Fig. 8, the top line shows the section of the drum associated with a particular recording from an incoming line. This section is divided into a number of elements which are grouped into blocks of six by means of the elements M1, M2, M3, etc. which provide a distributor operation for both the reception and retransmission of the message. In the initial state M1 is a "1" and M2, M3, etc. are "0." With M1 in the "1" state, the first received character is stored in the five elements following M1 and, as the character is stored, M1 becomes "0" and M2 becomes "1" so that the second received character will be stored in the five elements following M2. This action proceeds successively until eventually M1, M2, M3, etc. will all be "0" showing that the message is fully received. When the first character passes from the drum store M1 is made "1." Similarly as the other characters are read out from the drum the respective M*n* are made "1" so that, when the complete message has been retransmitted, M1, M2, M3, etc. will all be "1." M2, M3, etc. are changed to "0" but M1 remains "1" and the record will be back to the initial condition.

The elements 1–5 in each group following this M element are associated with the 5 variable elements of a telegraph signal in standard 5-unit constant total permutation code, the first variable element being stored in 1, the second in 2, etc. It should be noted that there is no necessity to provide storage for the start and stop elements as these can be added at the time of final retransmission.

The waveforms and pulses used in the circuit for the initial recording operation are as follows:

PC is a pulse which becomes positive for each of the M1, M*n* elements.

IPC is a waveform which becomes positive for the sections of the drum which are used to store the telegraph elements.

*t*1, *t*2 and *t*3 are the pulses previously mentioned which occur for each element, *t*1 coinciding with the beginning of an element and *t*2 and *t*3 being progressively delayed.

Not shown in Fig. 8 but used in the circuit arrangement, are $-p$ pulses. These pulses are derived from the clock track and are intended to occur at a rate of 1 in 2 msecs., i.e. 500 cycles/sec. In the description to follow it will be assumed that the rotation time of the magnetic drum is 50 msecs., so that, by having a clock track arranged to give 25 pulses in each revolution, the necessary $-p$ pulse may be provided. As will be seen from Fig. 17, a time scale 171C operating on a ratchet start principle utilises these pulses. If it is considered that the starting error using 500 cycles/sec. as the basic frequency is too great, the rate of these pulses could be increased accordingly by suitably modifying the clock track and adding further dividing stages in the time scale.

The circuits are shown throughout in functional form, a convenient arrangement for description since the basic electronic elements used are few in number and comparatively simple in operation are known from prior art patents, and are readily joined together to give a composite circuit arrangement. A table of symbols is shown on the first sheet of drawings as an aid to the interpretation of the circuit diagrams.

Electronic coincidence gates, well-known per se, and shown in U.S. Patent No. 2,653,996, are shown as circles with incoming controls shown as radial leads with arrowheads touching the circle. The output control is shown with a radial lead with the arrow-head pointing radially outwards. The number inside the circle indicates the total number of controls which must be energised for the gate to deliver an output; for instance, if there are four controls, and the number in the circle is 2, then the gate will deliver an output when any two of its controls are energised. Gates are indicated by the letter G followed by a reference letter. A small circle around the tip of an input control denotes that that control is of an inhibitory nature, i.e., a potential on the inhibiting control will prevent the gate opening whatever the condition of the other inputs. It is generally realised in practice as a positive control passed through a phase inverter circuit (q.v.) so that "positive" and "zero" (presence and absence) of the control are interchanged. An example of such an inhibiting control on a gate is shown by input control labelled **12*f*3 associated with G116** of Fig. 1.

Figure 3:
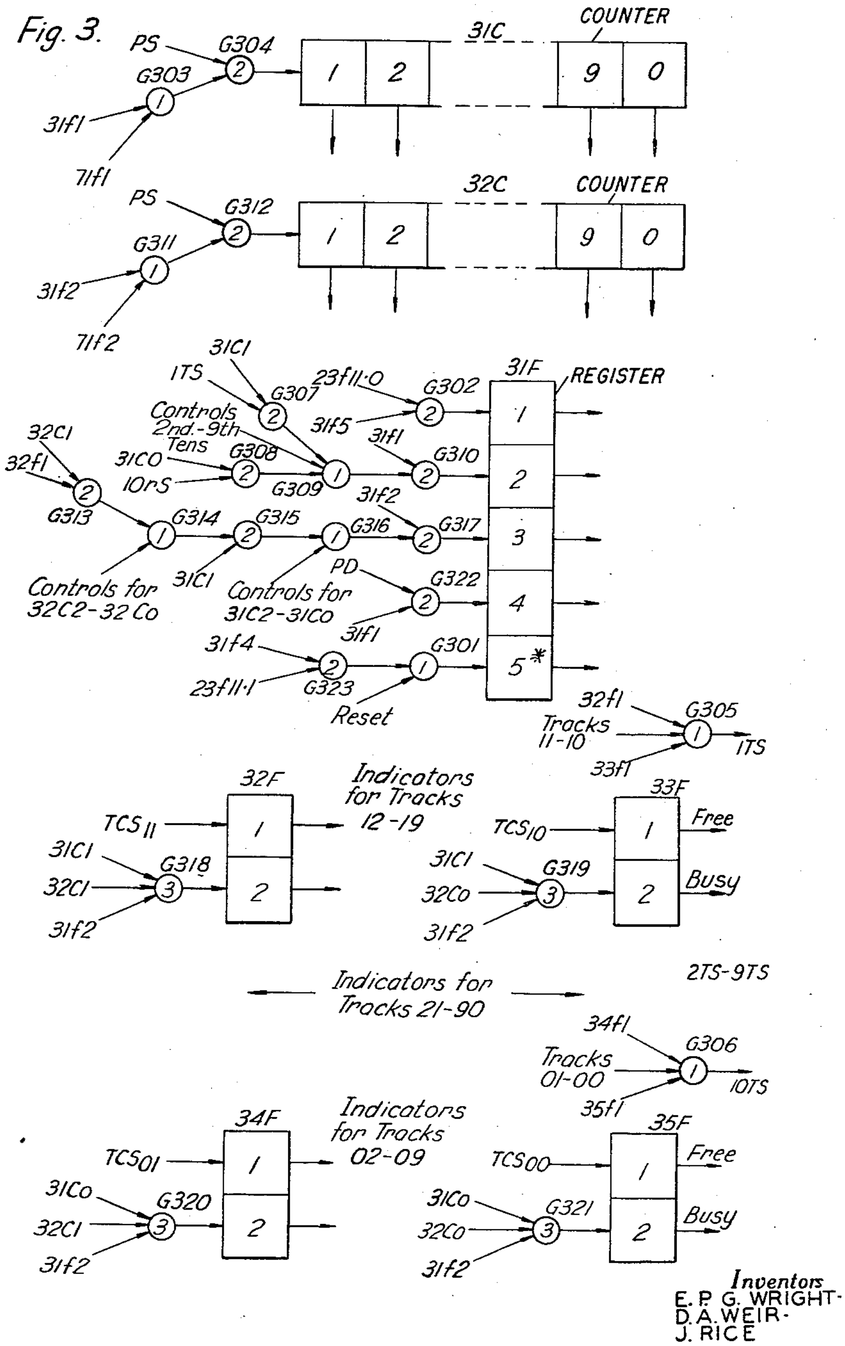

A counter comprising a number of single-component stages each of which is capable of assuming one of two conditions, "on" or "off," is shown as a series of rectangles drawn in linear array, e.g. 31C or 32C, Fig. 3. The counters shown all count to the end of their cycle and then reset during ordinary operation. Indication is by the leter "C" preceded by a reference number and individual elements of the counter by a further reference figure following the letter "C." In the case of a counter used as a time-scale, individual outputs are given TS numbers, to indicate their timing from the starting point. Electronic time scales of the type used herein are known from the copending application of V. J. Terry, D. S. Ridler and D. A. Weir, filed March 29, 1949, and bearing Serial No. 84,104.

A flip-flop of the bi-stable type (or 2-position register) has two elements, or positions, and stands always in one or other position, change from one to the other being effected by a suitable control applied to the non-energised position. These flip-flops are indicated similarly to a counter, but using "F" or "*f*" for "C" or "*c*."

A pattern movement register of the type shown in U.S. Patent No. 2,649,502 is shown as a horizontal row of separated rectangles linked together, with an input or controlling gate at the left, outputs being shown from any one or more of the separate elements. Inputs to individual elements may also be indicated by arrows. The usual indication is by means of an "R" and a preceding reference number, e.g. 41R, Fig. 4, with a succeeding number for the individual sections, and a lower case *r* for the individual outputs as controls. A small circle at one corner of the right-hand element denotes that the register is non-recycling. Such a circle may be seen on the lower right-hand corner of the right-hand element labelled "1" in Fig. 4.

Figure 4:
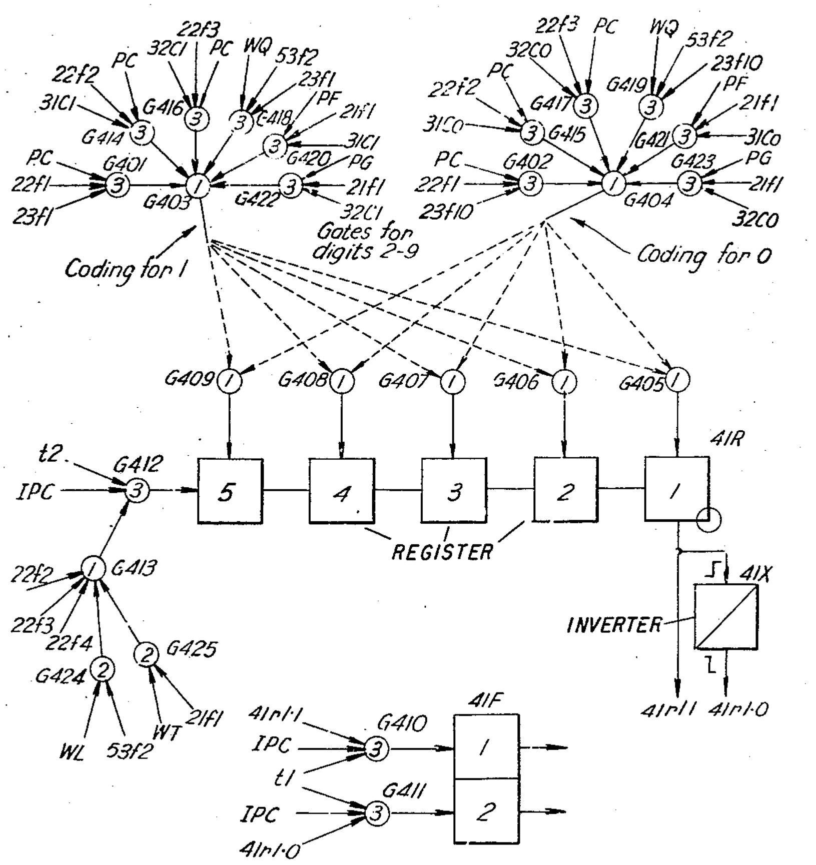

The phase inverter, shown as 41X in Fig. 4, is used to give a positive output where none exists, and vice versa, and is described in U.S. Patent No. 2,688,695 issued September 7, 1954. This device is useful when a positive output from an element is required, whatever its state, as in 41R1, Fig. 4. Thus **41*r*1·1 is a normally positive control, but 41*r*1·0** is normally zero, i.e. ineffective. By interposing the inverter, however, it becomes a positive control for zero, but zero for the normal output.

So far as possible, the various items in the separate figures are given reference numbers which indicate in the first portion the figure number, and in the last portion the identifying number of the item. For gates, which are numerous, the latter occupies the tens and units positions, while for other items the units digit only is used. Thus, G408 is a gate (08) in Fig. 4, whereas 41F would be a 2-position register in Fig. 4.

The description of the system will be given in several distinct stages, comprising (*a*) reception of incoming 7½-unit code teleprinter signals and their transfer to a track on a magnetic drum (the line track); (*b*) transfer of incoming message from line track to a storage track in a common store; (*c*) use of extension tracks in the common store; (*d*) booking of incoming messages (single storage track); (*e*) booking of incoming messages (involving extension storage tracks); (*f*) selecting the highest priority incoming booking of completed messages; and (*g*) presentation to an operator of the first line of the selected stored message.

Figures 17, 18:
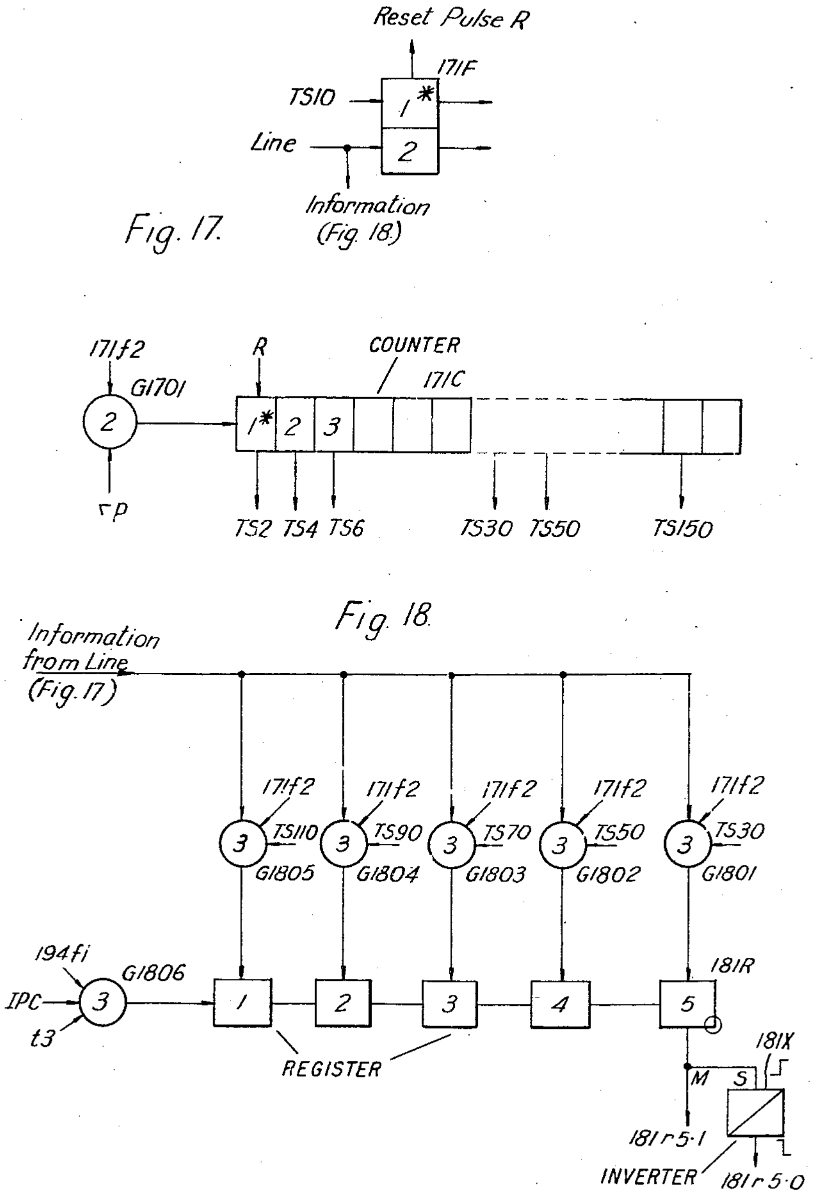

To pass now to the description of the first stage, (*a*) the reception of incoming teleprinter code signals, Fig. 17 shows the receiving circuit and a time scale for controlling the reception of the signals and their transfer to a track on a magnetic drum via a transfer storage register in Fig. 18.

The time scale consists of two stages in tandem, shown in Fig. 17 as a block 171C, the first stage stepping, when operated, at a rate of 1 step for each applied $-p$ pulse, i.e. 1 step in 2 msecs., and the second stepping once for each complete rotation of the first, i.e. 1 step in 20 msecs. These stages may be realised as 10-position counters although the circuit arrangement for the second makes use of 8 positions only; this is simply due to the fact that a 10-position multi-cathode tube would provide a suitable practical realisation. Any other arrangement using individual gas tubes would be suitable.

The outputs of 171C are shown as TS numbers which indicate their position in milliseconds on the time scale.

As will be seen later, the time scale is returned to its rest position either before 7½ uniperiods have elapsed from the commencement of the start element during reception or at 7½ uniperiods during retransmission, the latter time being in agreement with normal teleprinter practice in which 7½ unit transmission is used.

The time scale is controlled by means of two start-stop pairs, 171F during reception of a message from a teleprinter.

The register 181R in Fig. 18 is a pattern movement of the type described in said U. S. Patent No. 2,649,502. Gates G1801–G1805 are used for inserting information into the register when signals are being received from the line. When the five variable elements of a character have been stored, the pattern set up in 181R is stepped by means of G1806 and the output of 181R5 is read off into the drum store for each step. To provide positive information for both a "1" and a "0" stored in 181R5, an inverter, 181X, is incorporated so that for a "1", **181*r*5·1 is positive and 181*r*5·0 is zero and for a "0", 181*r*5·1 is zero and 181*r*5·1 is positive. This has been referred to previously. For convenience, it has been assumed that for a mark variable element, 181*r*5·1 will be postive and for a space variable element, 181*r*5·0** will be positive.

Figure 19:
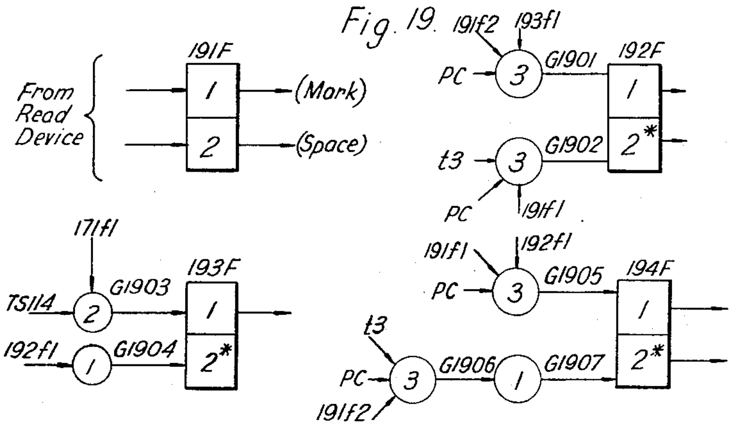

Passing now to the control circuit of Fig. 19, 191F is a flip-flop or 2-position register used for staticising, element by element, information taken from the drum by the reading device. By "staticising" is meant that the transient signals derived from the drum are given a steady character as the output of the flip-flop. The arrangement is such that **191*f*1 is energised for a "1" read from the memory and 191*f*2** is energised for a "0".

192F and 193F are 2-position registers which are used to note that information is to be passed to the memory, **193*f*1 energised denoting that the character elements have been received and may be passed to the store. In the initial state 192*f*2 is energised but when the time scale passes to the stop uniperiods, during reception of a character, G1901 opens under control of 193*f*1 causing 192*f*1 to be energised. G1902 is used to return to the state with 192*f*2** energised.

194F is the 2-position register which allows information stored in the register 181R, to pass to the appropriate character storage section of the memory store. This is accomplished by energising 194F via G1905, when the correct distributor "M" element is encountered. G1906 is used to reset to **194*f*2** energised when the end of the appropriate section is reached.

Figure 20:
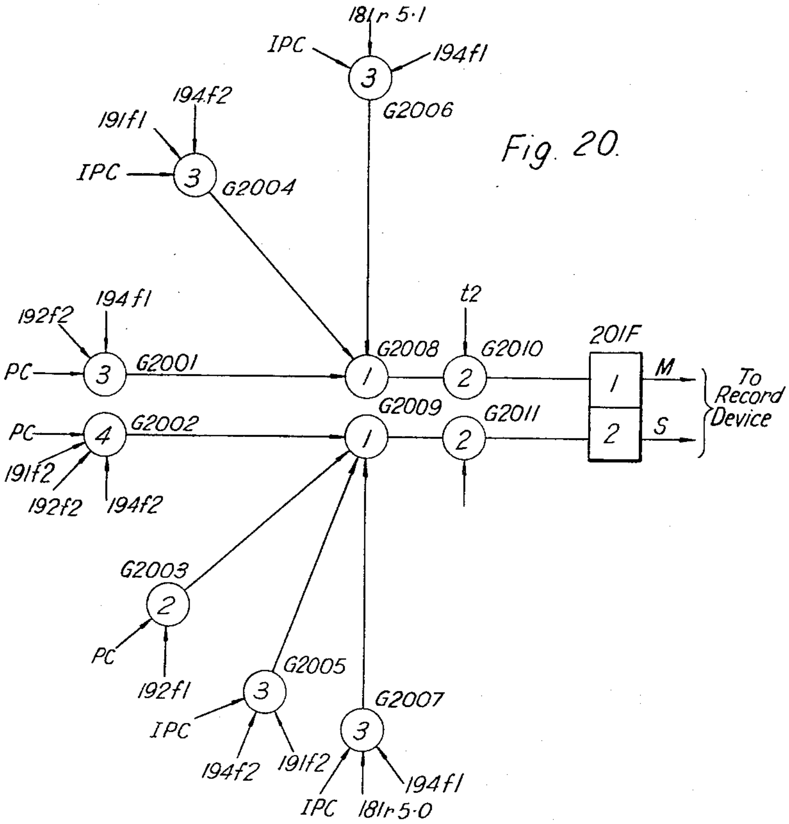

In the recording unit of Fig. 20, 201F is the 2-position register the output of which is associated with the recording device to permit the wanted recording to take place.

G2001–G2003 are used in connection with elements M1, M2, M3, etc., the multiplicity of gates being necessary to provide the distributor requirements, previously described.

G2004–G2007 are used in connection with the recording of the variable elements of the telegraph characters, G2004 and G2005 being used to reinsert unchanged a character as read by 191F (Fig. 19), and G2006 and G2007 being used to insert a new character.

The outputs of 201F are such that when a mark telegraph element is to be recorded, **201*f*1 is energised to record a "1" and when a space telegraph element is to be recorded, 201*f*2** is energised to record a "0."

With this introduction, it is possible to pass to the detailed description of (*a*).

The detailed description of the circuit operation will be given in conjunction with Fig. 21, which illustrates the essential changes for each stage of the reception. For illustrative purposes, the receipt of the first 3 characters only of a message is described, the five variable elements of these characters being assumed to be:

| | | | | | | |
|---|---|---|---|---|---|---|
| (1) | Mark | Space | Mark | Space | Mark | (MSMSM) |
| (2) | Space | Mark | Space | Mark | Space | (SMSMS) |
| (3) | Mark | Mark | Space | Mark | Mark | (MMSMM) |

In the initial state the 2-position registers are for the most part in the "2" condition, shown by an asterisk. No section of 181R is energised.

The condition of 191F is dependent upon the condition of the record already on the drum, that is, M1 is a "1," M2, M3, etc., are "0" and the character storage sections will be in the condition left from the previous recording. Fig. 21(*a*) illustrates the initial condition of the track section.

The condition of 201F is dependent upon the condition of 191F, for, in the initial state, G2002, G2004, G2005, G2008—G2011 are the only gates which may open and it can be seen that 201F will be set at time *t*2 according to the setting 191F at that time.

When the first character is received, the line (Fig. 17) changes to space and in so doing energises **171*f*2. The next $-p$ pulse to arrive will open G1701 and 171C will stop under control of the $-p$ pulses. When 171C reaches TS30, i.e. 30 msecs. from the beginning of the start element, a time coincident with the centre of the first variable element, the condition of the send line is examined by G1801. This element is assumed to a "mark" and so G1801 will open and 181R5** will be energised.

At time TS50, i.e. 50 msecs. from the beginning of the start element, the line is again examined, this time by G1802. Since the second variable element is assumed to be space, G1802 will remain closed and 181R4 will remain nonenergised. The time scale continues to step and subsequent elements are examined by G1803, G1804 and G1805 in turn. With the assumed first character (MSMSM), the register 181R will be set with 181R5, 181R3 and 181R1 energised, 181R4 and 181R2 non-energised.

The information thus stored in 181R is to be transferred to the line track (line store) in the correct place, i.e. following the M element which is 1 at some time between the end of the character in question and the examination of the first information element (at TS30) of the next, a total period of time (for 7½ unit code) of 60 msecs. Since the drum revolution period postulated is 50 msecs., this provides ample time in the worst case, when M1 is just missed in the current revolution.

At time TS114, i.e. soon after the examination and transfer to 181R of the last information element, and 171F being still at **171*f*2, G1903 opens, and 193F is energised to 193*f*1. At the next pulse of the PC pulse train, 191F is at 191*f*2, so that G1901 opens and 192F passes to 192*f*1. At some convenient later time in the cycle, e.g. at TS130, during the stop period of the character, 171F is energised to 171*f*1, thus causing a reset signal R to be applied to 171C1**, and the time scale is restored to position 1 energised.

The PC pulse which coincides with the M1 pulse (at 1) will open G1905 and **194*f*1 will be energised; since M1 is a "1," 191*f*1 will be energised at this time and 192*f*1 has been prepared previously. The operation of 192*f*1 also closes G2001 and G2002 (Fig. 20) but opens G2003** for the PC pulse so that at time *t*2, G2011 opens causing **201*f*2 to be energised and "0" will be recorded for M1**. At time *t*3 in the PC pulse, G1902 (Fig. 19) opens and **192*f*2** is re-energised. These operations are charted in Fig. 20.

When the waveform IPC coincident with the first section appears, both G2004 and G2005 (Fig. 20) are closed since **104*f*2 is no longer operative. However, G2006 and G2007 are partially prepared by IPC and 194*f*1**. At time *t*2 coincident with the first recorded element of character 1, **181*r*5·1 (Fig. 18) will be positive so that G2006 and G2010 open and 201*f*1** will operate causing "1," i.e. a mark, to be recorded for the first element. At time *t*3, G1806 (Fig. 18) opens and the pattern in 181R will be stepped one position to the right so that now **181*r*5 will record the second variable element, and, since this is a space, 181*r*5·0 and not 181*r*5·1** is positive. Thus for the second element, read at *t*2, G2007 and G2011 (Fig. 20) will open and **201*f*2 will be energised causing "0" to be recorded. Again the pattern in 181R is stepped via G1806; the process is repeated for the following variable elements so that 201F will have recorded the original contents of 181R**. The last step causes the register to be cleared with no positions energised.

For the PC pulse coinciding with M2, **191*f*1 is not energised so that G2001 (Fig. 20) will remain closed. G2002 remains closed in the absence of 194*f*2 which is still non-energised but G2001 is opened by 192*f*2 and 194*f*1**. At time *t*2, G2010 opens, **201*f*1 is energised and a "1" is recorded for the M2** element. At time *t*3 during this PC pulse, G1906 (Fig. 19) will open and **194*f*2 will be re-energised. In consequence the elements in CH2 will be recorded as read by 191F using G2004 and G2005 (Fig. 20), although at this time this is of no consequence for these elements wil have been left over from the previous recording. G2002 causes M3 to be recorded as "0" and CH3 is reproduced by means of G2004 and G2005**. The state of the recording is now as shown in Fig. 21(*b*).

It should be understood that the transfer of the first character takes place in the total inter-character period of 60 msecs. and no further character will be passing from the teleprinter to R1 at this time. (The full period is actually 66 msecs., taking into account that transfer is initiated at TS114—see G1903.)

The second character is now sent from the teleprinter and, as the first character, is passed by means of the time scale into the register 181R. Whilst this is taking place the previous recording (Fig. 21(*b*)) will be read by 191F (Fig. 19) and re-recorded by 201F (Fig. 20) exactly as read. Again when the time scale reaches TS114, denoting that the variable elements have been received, G1901 opens with a pulse PC and **192*f*1 (Fig. 19) is energised. Since M1 is now a "0," the first PC pulse after this does not open G1905. However, M2 is now a "1," so that the PC pulse coinciding with M2 opens G1905 and 194*f*1 is energized. (See 2, Fig. 21). This causes the contents of 181R, i.e. SMSMS, to be recorded by 201F in the element positions in CH2. Also because 192*f*2** is not re-energised until time *t*3 of the PC pulse coinciding with M2, both M1 and M2 will be recorded as "0" by means of G2003 (Fig. 20). Until time *t*3 of the PC pulse coinciding with M3, **194*f*1 remains energised so that a "1" is recorded for element M3 by means of G2001. The elements in CH3 will be recorded by 201F as read by 191F**. The recording on the line track now contains the first two characters, as shown in Fig. 21(*c*), and remains the same until the next character is transferred.

The third character is now passed as previously described from the line into the register. Again when the stop element is reached (see 3, Fig. 21) **192*f*1 is energised. The first "1" coinciding with a PC pulse occurs for M3. The elements prior to M3 will be recorded as read by means of G2003 (Fig. 20) for M1 and M2 and by means of G2004 and G2005 for CH1 and CH2. For M3, 192*f*1 will be energised and, in consequence, M3 will be recorded as "0" by means of G2003. Also the PC pulse opens G1905 (Fig. 19) and causes 194*f*1** to be energised. At time *t*3 of the M3 element, G1902 opens and **192*f*2 is re-energised. The fact that 194*f*1 is energised during the CH3 element positions causes the contents of 181R (Fig. 18), i.e. MMSMM, to be recorded by 201F**. The recording is now as shown in Fig. 21(*d*) and for further cycles of the drum; this record will be read by 191F and re-recorded by 201F.

Having described one possible process by which an incoming teleprinter message may be recorded on a magnetic drum, a process will be described for effecting transfer of the message to a common store, as well as a process for making a "booking" entry on a special booking drum track of particulars relating to the message for facilitating its further disposal. These constitute items (*b*) to (*e*) referred to earlier, and although there is considerable overlap among these items, yet it will be convenient to treat them under separate heads, making cross-references where necessary.

First, however, Fig. 16, the overall schematic of a switching center will be described, and also Fig. 8, in greater detail than previously.

Fig. 16 shows an incoming line connected to an incoming line track via a line circuit LC which is not the same as that just described, but which exercises a line finder control in association with the block "Line Selector Control" (23F) and the 23F$_m$' finder arc for finding the track, or a track which has a message ready for transfer.

The identification of such a track by 23F initiates the search by a 100-line selector 31C, 32C (10 x 10 electronic counters) for a free common store track, under the control of 31F, and when one is found, the incoming link, shown as 21F—which, in fact, is a purely electronic link (drum cycle control)—initiates transfer from the line track to the selected track. The track indicators, 32F—36F, are individual to the common store tracks, and comprise electronic relays (flip-flops) which exercise a selector controlling function via 31F.

A subsidiary feature of this, not shown in the figure, is the mechanism for selecting continuation tracks in the common store, for use by long messages, and for recording the identities of the several tracks.

Parallel to the transfer operation there is provided a booking operation for each incoming message. The booking information comprises the identity of the incoming line and the indicated priority of the message, together with the identity of the common storage track used, or, if more than one is used, of the first one, and also whether or not the booking relates to a completed message.

Figure 5:
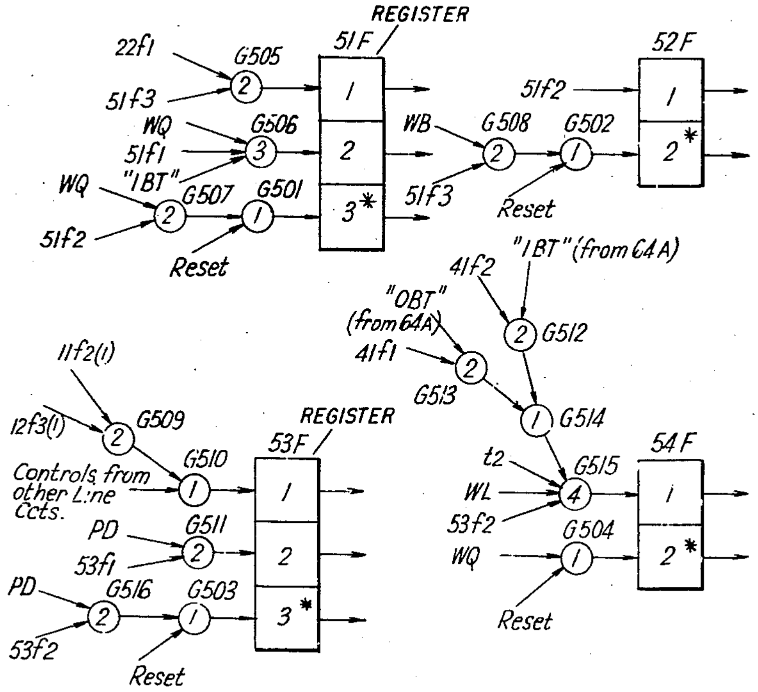
Figure 6:
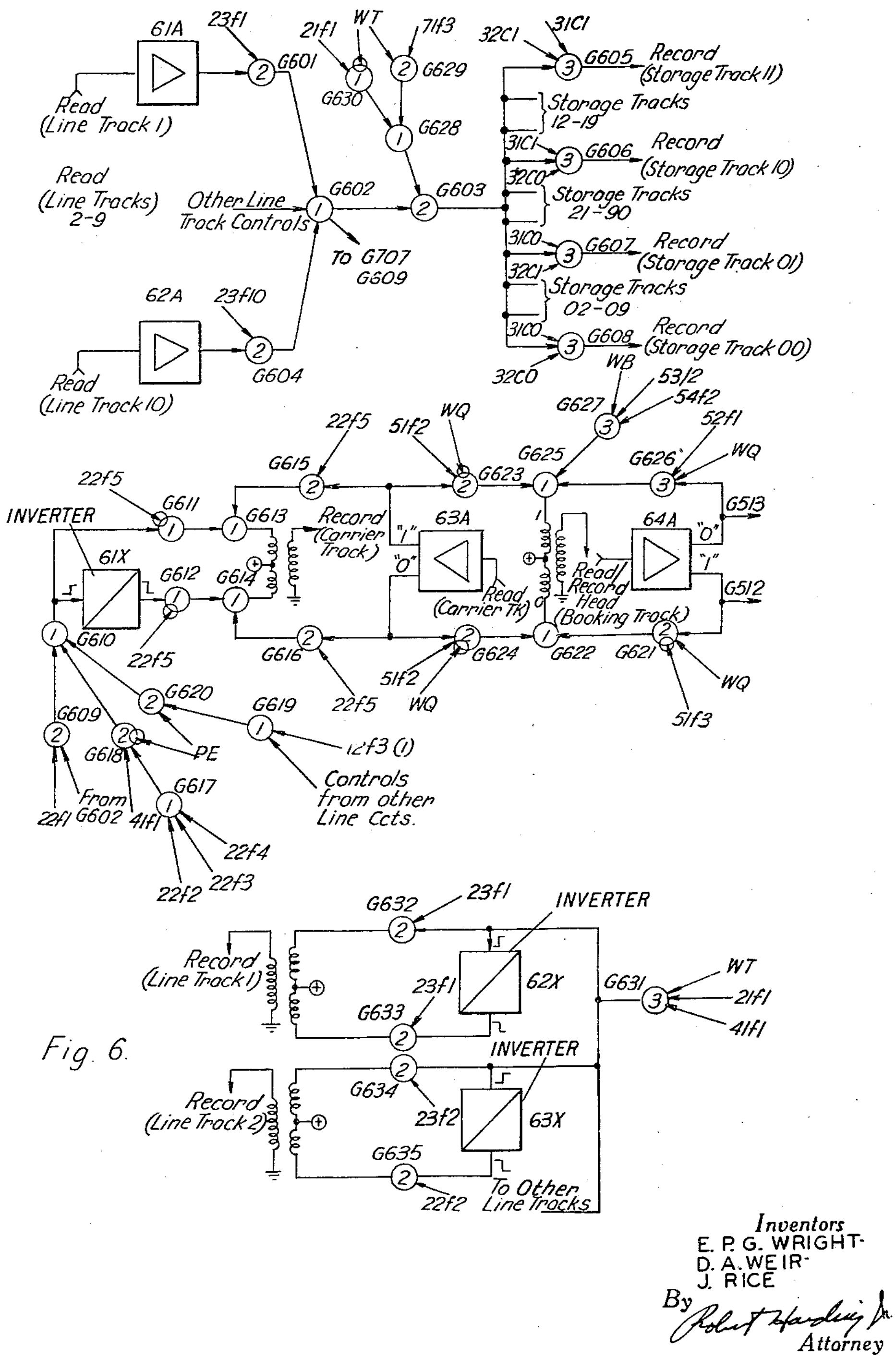
Figure 7:
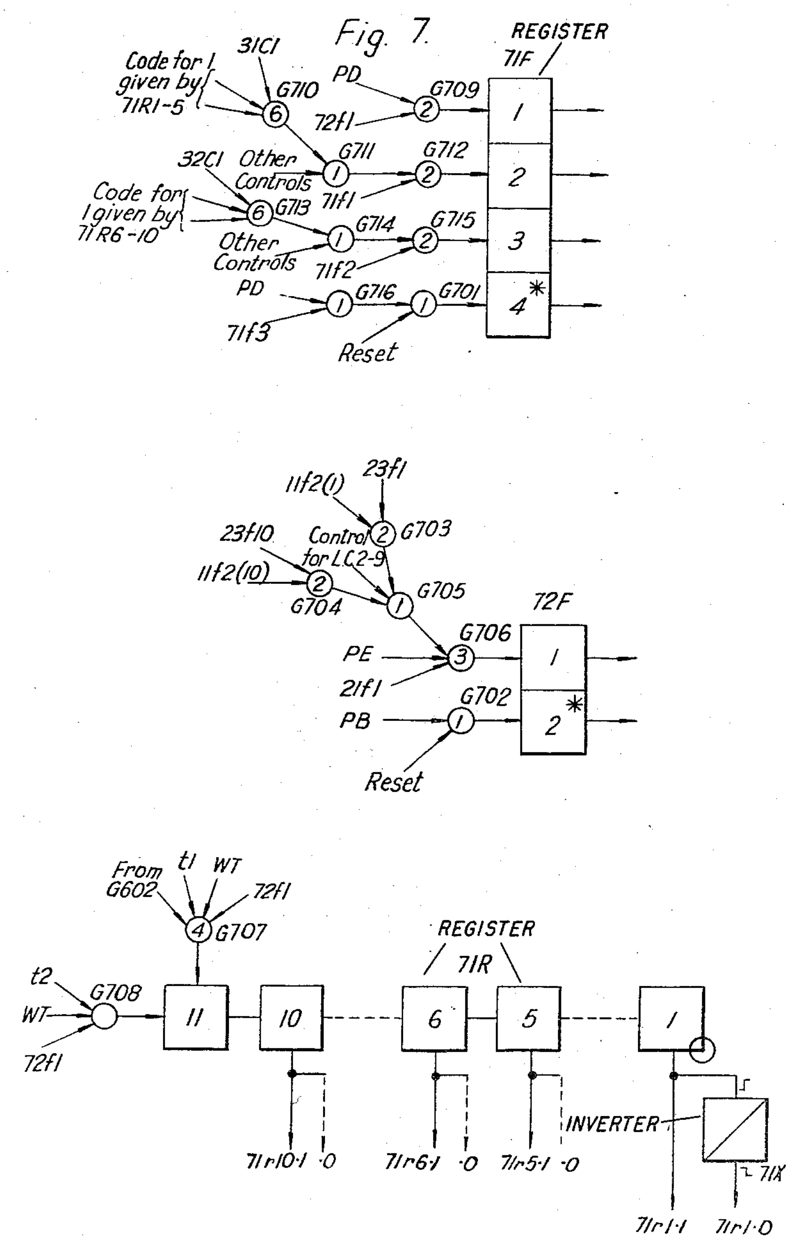

The various items of information are selected by the incoming booking control, 22F, and assembled in correct order on a track of the drum styled a "carrier," as its function is to carry the booking information around the drum (by continued transfer along its track) until it coincides in position with the first free space (next booking position) on the booking track. The information is then transferred (Fig. 5 block) to this position, and the carrier track freed for another booking operation.

At this point, the message may be disposed of automatically in accordance with its priority and address(es), or it may be dealt with by an operator, as in conventional tape relay systems. Only the operator controlled system is to be considered in this instance, and for this, the "first line" (as defined) of the message is brought in due time, according to the indicated priority, before the operator as a message on tape. This first line includes the destination information from the relevant track in the common store, and the operator then proceeds to make an outgoing booking on an outgoing booking track by means of keys at her position for keying up the destination information. The use of a carrier track, booking control and booking transfer circuit at the outgoing side is very similar to that on the incoming side.

The outgoing booking information is then used to set up an outgoing link circuit connecting the common store with an outgoing line track to which the stored message will be automatically transferred, and then transferred to line.

As shown, the various tracks and stores are all separated, but may in practice constitute different sections of a single magnetic drum, as indicated in Fig. 16A.

Figure 8A:
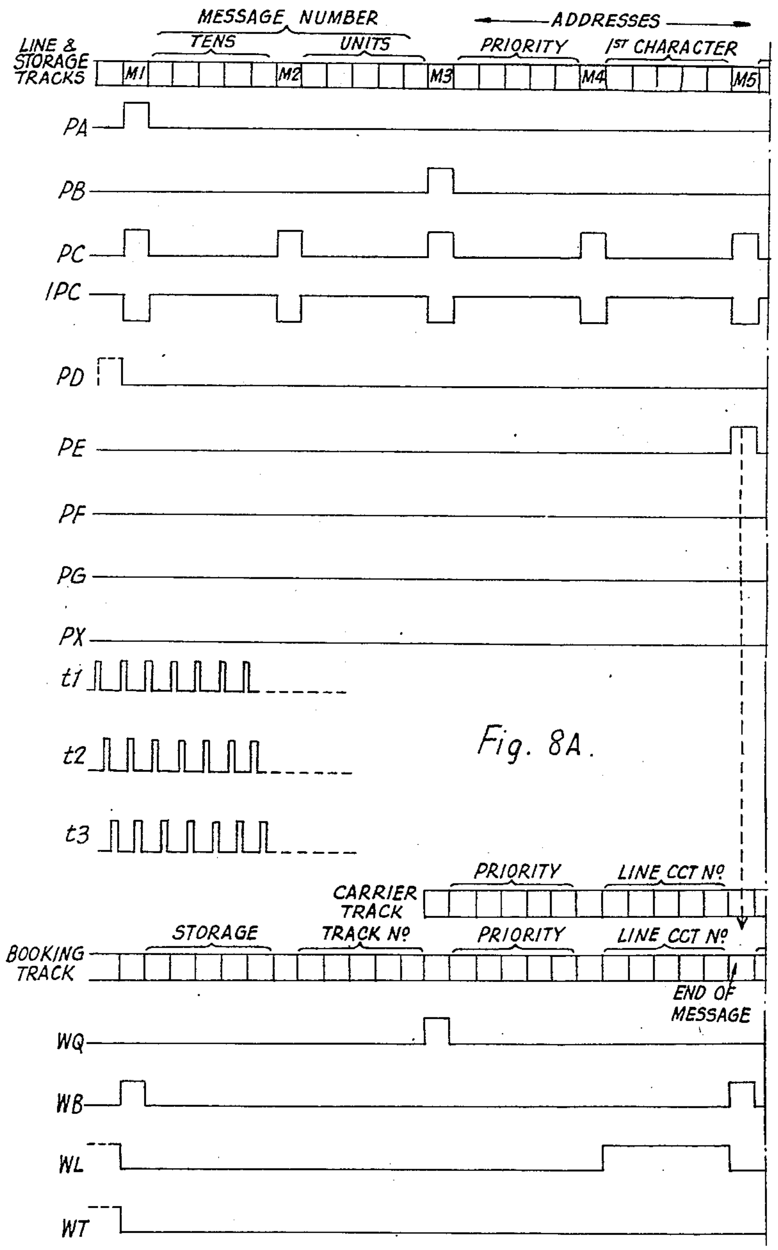
Fig. 8 (in two parts, A and B) shows various controlling wave-forms and pulse trains together with a representation of a magnetic drum storage track as used for line storage and common storage, and also representations of a booking track containing consecutive entries and a carrier track for making entries at the correct position.
Figure 8B:
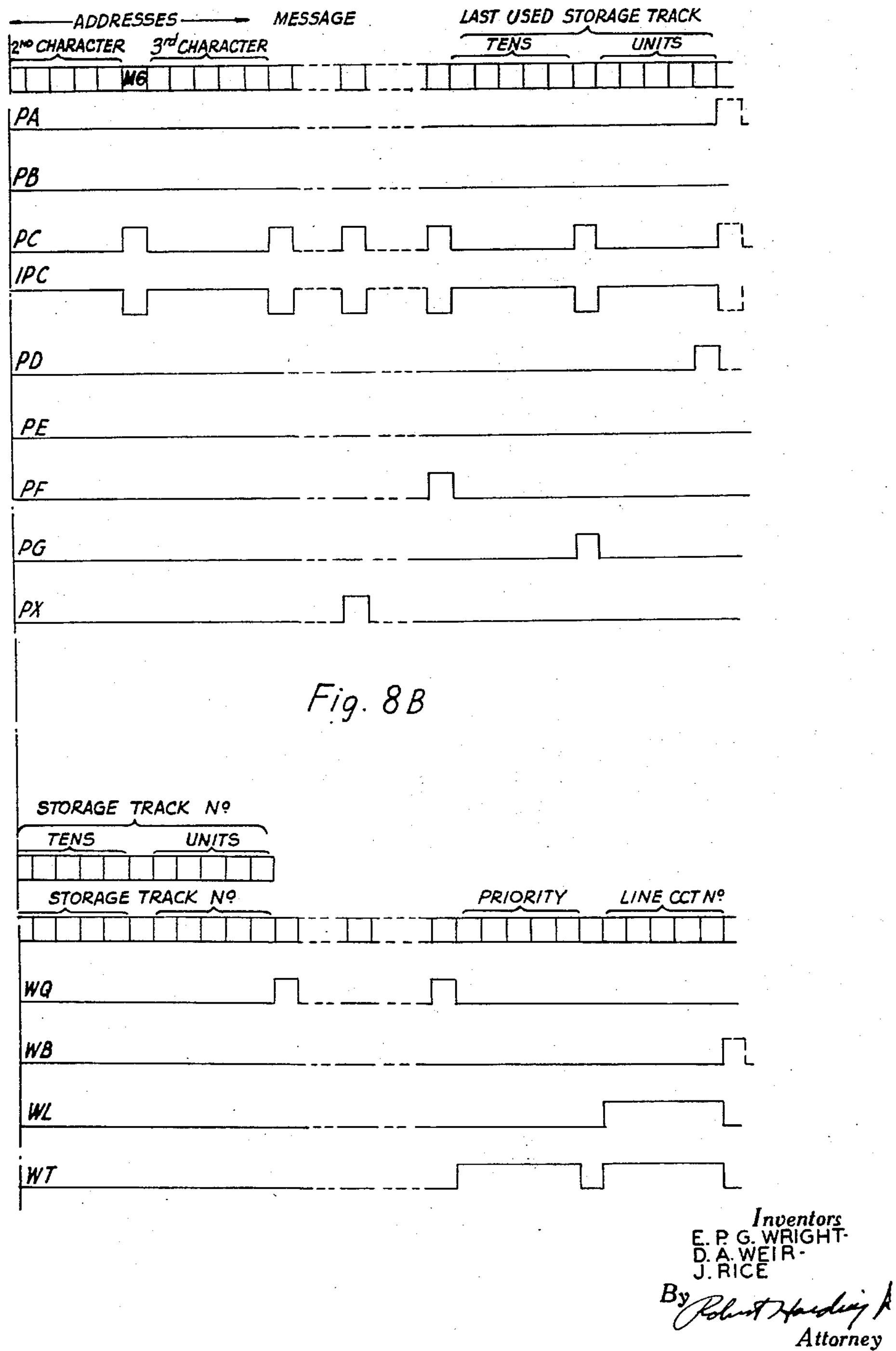

Fig. 8, in two parts 8A and 8B with Fig. 8B intended to be placed to the right of Fig. 8A shows the various pulse trains and wave forms used for controlling purposes, and these will be referred to in due course as their function appears. One or two, such as PC and IPC, have been referred to already in the earlier description.

The line track and common store tracks, where incoming messages appear in identical form, are shown at the top of the figure, while lower down the booking and carrier tracks are shown, with their associated wave forms below.

The P . . . pulse wave forms are individual to the drums, whereas the W . . . wave forms are individual to the booking sections, and are repeated around the drum periphery accordingly.

The arrangement now to be described with reference to Figs. 1–7 is one in which each line circuit has an associated track for recording incoming messages and, as the line track is filled or messages are completed, the contents are transferred to a common group of storage tracks. According to the length of an individual message, one or several transfers may have to take place. Although, in general, the operation during a transfer is the same irrespective of the number of transfers which have to be made for each message, slight variations occur dependent upon whether or not the end of message character has initiated the transfer. Variations due to this cause occur also in respect of the booking operation described hereafter.

(b) *Transfer of a message requiring one track*

A message incoming on a line circuit is recorded on the associated line track in the manner described herein. For the case in which a message is less than the capacity of the line track, the "end of message" character will be received before the track is completely filled. Since it is possible that, in a coded message, a character may encode to the end of message character, and in order therefore to provide a safeguard against false operation, it will be further assumed that a space is included in the stop element of the true end of message character. For an example, the end of message character is assumed to be SMSMM followed by a space in the stop element. The multistable register 12F is used as a means of detecting the required character in association with the pulses TS30—TS110 obtained from the time-scale. It should be noted that G104 and G106 are arranged to open for elements of opposite polarity to those assumed for the end of message character so that **12*f*4** will be energised for any received character other than the end of message character.

Figure 1:
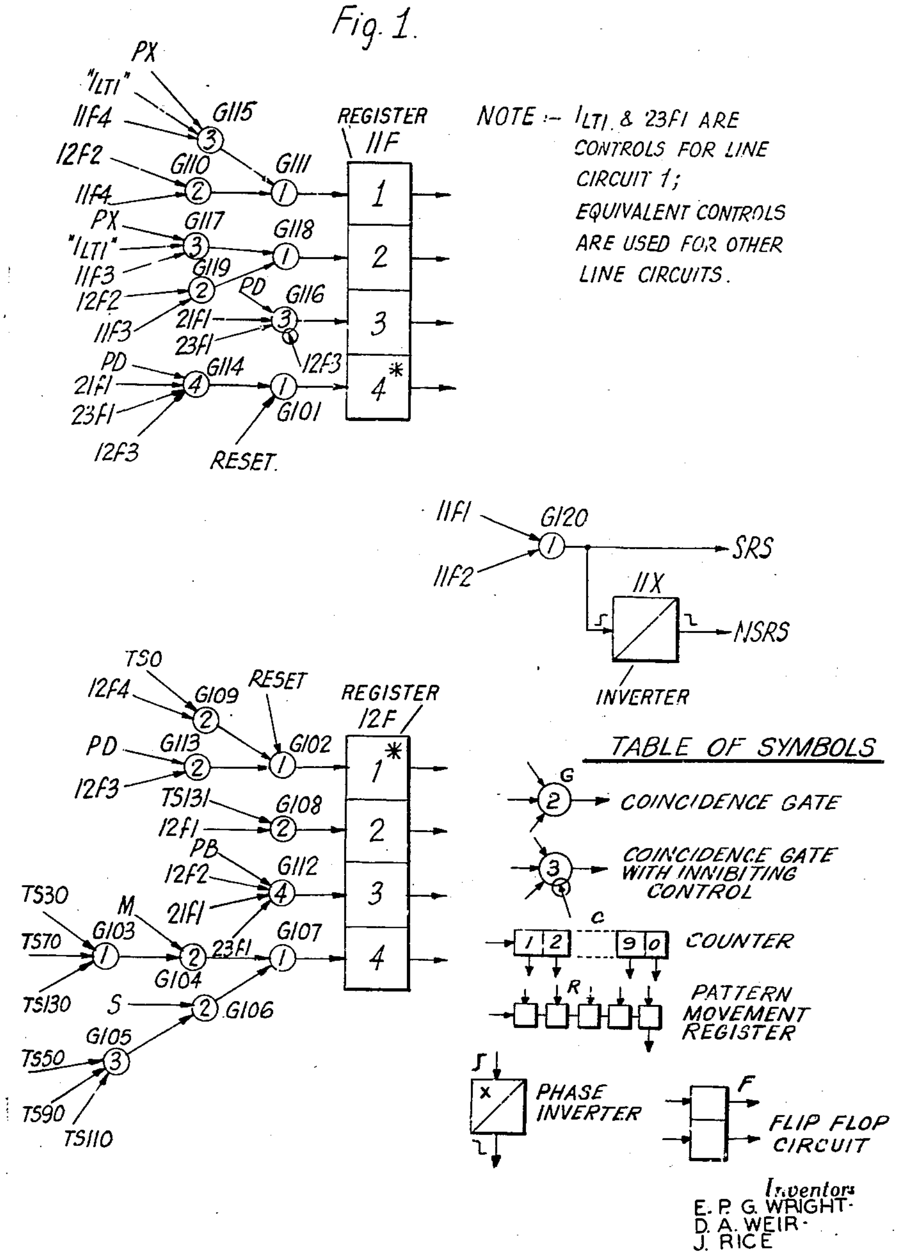
Figs. 1–7 are control circuits used in transferring a message received on a line terminating store to a common store, and in making a booking entry relative to the message transferred.
Figure 2:
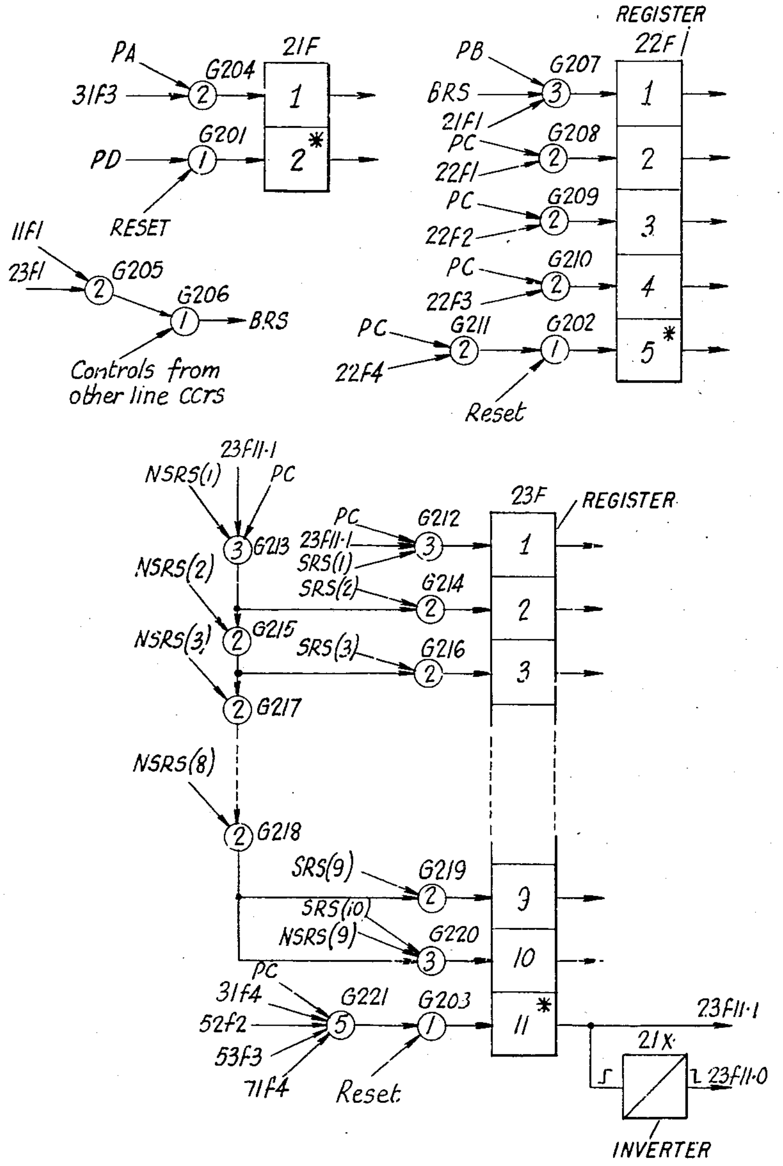

The equipment in Fig. 1 is particular to line circuit 1, it being assumed there is similar equipment for the other line circuits.

Initially the positions of multi-stable registers such as 11F, 12F, having an associated reset signal will be in an energised condition denoted by an asterisk. As the message is received in the line circuit, the character elements are applied, examined and directed, according to whether they are mark or space, to G104 and G106 respectively. The timing elements TS30—TS130 are distributed between G103 and G105 according to the inverse of the selected end signal. For any character other than the end of message character, **12*f*4 will be energised by the opening of one of the examining gates so that, at TS132, for every such character, G108 will remain closed and 12*f*2 will not be energised. When the time scale returns to its rest condition, TS0 energised, G109 and G102 will open and 12*f*1 will be re-energised. This operation continues until the end of message character is received. For this character, neither G104 nor G106 will open and 12*f*1 will remain energised so that at TS132, G108 will open to energise 12*f*2. 12*f*2, in combination with 11*f*4, opens G110 and G111 to energise 11*f*1. The latter opens G120 causing SRS, Storage Required Signal, for this particular line circuit to become positive to indicate to the common equipment that the message on the associated line track is ready for transfer to a free storage track in the common pool. For other line circuits, not active, G120** will remain closed, SRS will be at zero, and NSRS will be positive.

At this time, the common equipment may already be engaged in a transfer for another line track and the new transfer will have to wait for the other to be completed. To allow for this waiting time, sufficient time must be allowed between the end of one message and the commencement of the next message. This time will be comparatively short for, as will be seen, the maximum time the common equipment is engaged in a transfer operation is three revolutions of the drum store. Thus, even if one considers ten line tracks requiring transfer at the same time, the delay time involved even for the worst case would be thirty revolutions only which, with a drum revolution time of, say, 50 milliseconds would be 1.5 seconds only, equivalent to approximately 10 characters at a speed of 50 bauds.

The indication that the common equipment is already engaged is given by the fact that **23*f*11·1 is at zero potential, i.e. the multi-stable register 23F is off its rest condition. This multi-stable register has a position associated with each line track, 23*f*1—23*f*10 for the assumed ten line circuits, and one position, 23*f*11, indicating the "line track selector free" condition. As can be seen, the combination of gates G212—G220 includes the control 23*f*11·1, so that none of the gates can open when 23*f*11·1 is at zero potential, so preventing 23F from being moved to another position until a current transfer has been completed. When 23*f*11·1 becomes positive once again, indicating that the common equipment is in readiness for carrying out a further transfer, the gating arrangement G212—G220** is prepared for a new request.

Assume that line tracks 2 and 3 make a simultaneous request for transfer, no other line tracks making requests. G212 will remain closed but G213 will be open, for SRS(1) will be at zero potential and NSRS(1) will be positive. (N.B. A number in brackets after a reference indicates that there is a plurality of such references one to each line, the number indicating the particular line.) However for line track 2, which is making a request, SRS(2) is positive and NSRS(2) is at earth potential so that G214 is opened and G215 is closed. Although SRS(3) is positive, the absence of a control from G215 prevents G216 from opening, and NSRS(3) being at zero potential closes all the gates G217—G220 irrespective of other requests.

Thus, one only of the requests can cause the common equipment to become associated with a line track even for simultaneous requests. For the example given, G214 will energise **23*f*2, showing that the next transfer will be from line track 2; 23*f*11·1** will be at zero potential preventing further seizure of the equipment until the transfer indicated is completed.

The next requirement is to select a free storage track from the common pool, utilising 31C and 32C (Fig. 3) which act as a tens and units selector hunting for a free outgoing link to the common pool.

With **23*f*11·0 at a positive potential, G302 opens to energise 31*f*1 ("tens hunt") which, in its turn, opens G303. The PS pulses applied to G304 and G312 are stepping pulses which may be of any suitable repetition rate commensurate with stepping 31C and 32C to a free storage track position in a time slightly less than one revolution time of the drum. This rate is determined by the fact that it may be necessary to step 31C and 32C to a required position in the time which elapses between the PD pulse (end of one track revolution) and the beginning of the WT waveform (near the end of the next—see Fig. 8). Since the maximum number of steps to be made is 9 by 31C and 9 by 32C, i.e. 18 maximum, and the time of one revolution of the drum is taken to be 50 ms., the repetition rate of PS should be >360 c./s., but, for economy in searching time, a rate of, say 10 kc./s. would be more suitable. With G303 open, 31C will step under control of the PS pulses applied to G304**.

Each storage track has associated with it a flip-flop 32F—35F which is used to indicate whether or not the track is free for use. The free indicating controls from the "1" positions are grouped in tens on gates such as G305 and G306, the outputs of these gates being used to indicate that at least one storage track in the group is free. Thus, ITS positive indicates that at least one track in the first tens group is free, etc. Gates G307, G308 and other equivalent gates are used for testing purposes and are so arranged that when 31C steps to a position the group signal of which is positive, G309 opens, so opening G310 and causing **31*f*2 to be energized. G303 is thus closed and 31C no longer steps but G311 is opened and 32C will step to select a free track in the tens group indicated by 31C. For each tens group there will be a combination of gates such as G313, G314 and G315, it being understood that G313 is a representative of ten such gates, each having one position of 32C as a control. 32C1 is associated with the track indicator 11, 21 . . . 01, 32C2 with track indicator 12, 22 . . . 02, etc; 31C1 is associated with the group 11, 12 . . . 10, 31C2 with the group 21, 22 . . . 20**, etc.

When 32C steps to a position of a free track in the group indicated by 31C, G316 and G317 open causing **31*f*3 to be energised, so closing G311 and stopping the movement of 32C. The positions of 31C and 32C indicate, on a ten-by-ten basis, the number of the free track selected for receiving the message from the line track already indicated by 23F. The same control which opens G317 also opens the gate equivalent to G318—G321** of the track indicator of the selected track, so marking this track as busy. The indicator will remain in the busy condition until the pertinent track clear signal, TCS, is generated, when the message on the storage track is passed to an outgoing line track, when it will be reset to its free condition.

In transferring the message, it is necessary that transfer should start at the beginning of the message, continue for a complete revolution of the drum and then cease. This is accomplished by means of 21F which controls the transfer between the indicated line reading head and the selected storage track record head. The PA pulse, which is at the beginning of the message, opens G204, as soon as **31*f*3 has been made positive to indicate that a free track has been selected, and causes 21*f*1 to be energised. 21*f*1 opens G630, G628 and G603, so that the message from the line track denoted by the energised position of 23F passes via one of the gates G601, G604 or equivalent gate, G602, G603 and one of the gates G605—G608 or equivalent, as indicated by settings of 31C and 32C, to the record head of the selected track. It should be noted that G630 and, hence, G603** are closed during the WT waveform, the reason for this being indicated in the later description for a message requiring several storage tracks.

When the drum has made a complete revolution from the commencement of the message, the PD pulse opens G201 to reenergise **21*f*2** so cutting off the transfer circuit.

The same pulse also opens G322 to energise **31*f*4 so preventing the following PA pulse from energising 21*f*1 once again inasmuch as 31*f*3 is deenergized upon the energization of 31*f*4, therefore the two required inputs to open G204 are lacking. 31*f*4 is included so that, although 23F is still off its rest position, 31*f*1 cannot be energised to cause further search for a free storage track, at the same time preventing G204 from opening, as indicated above. The booking of the message (q.v.) will have been taking place meanwhile and as soon as the booking has been recorded in the appropriate part of the booking track 52*f*2 and 53*f*3 will be positive. No changes will have taken place in 71F so that the next PC pulse will open G221 to energise 23*f*11, 23*f*11 energised causing G323 to open and 31*f*5** to be energised, and the circuit is ready for a further transfer, the message just transferred being ready for further transfer to an outgoing line track. The latter operation will be initiated when the booking for this message is passed to an operator. These closing stages will be described in more detail in connection with "booking."

(c) *Transfer of a message requiring several tracks*

When a transfer is to be made from a line track, the free storage track selector allocates any free track to take the message. Thus, if a message is longer than one track capacity, the various sections of the message will be disposed more or less at random in the store. Of course it is possible to divide the storage tracks into groups, each group being capable of taking the longest possible message. However, apart from the fact that it is difficult to arrange that there is a maximum length to a message, this solution would represent uneconomic usage of tracks as compared to a method in which tracks are free for use by any message.

A solution for carrying out this process is to arrange that a record is made at the end of one storage track to indicate where the next section of message can be found. In the system to be described, the number of the storage track just used is recorded on the line track, in two predetermined character positions, this information being available for causing the extension track number to be recorded, when the next transfer is made, on the track indicated. This process may be carried out no matter how many extension tracks are required, each track having recorded on it the number of the track which holds the next part of the message.

To give an example, suppose that the storage track allocated for the first part of the message is A. After transfer has taken place, A is recorded at the end of the line track. The next transfer is made to track B and, at the end of transfer, A is read off and registered, at the same time B being recorded in place of A. The register containing A then causes the track selector to move to A and B is recorded on track A. If the last part of the message passes to C, although no further extensions are required, C is recorded on the line track for circuit convenience and information, B is read off the line track and registered. The register, now containing B, causes the track selector to move to B and C is then recorded on track B. Thus, when the message is passed to an outgoing line the sequence of the sections of the message is known and transmission can take place in the correct order. It is possible to use the booking register 41R (q.v.) for registering the current storage track number ready for recording on the line track, for this register is not in use for any other purpose at the time the storage track number has to be recorded. However, a separate register is required for receiving this same information when it is read off during the next transfer.

As described in the section dealing with the booking operation, if the end of message character is not received before a predetermined position of the line track distributor, 11F is still in the position with **11*f*4 energized and pulse PX causes G115 to open and 11*f*1 to be energised. As previously, 11*f*1 opens G120 causing SRS to become positive so that, when the common equipment is free, the position of 23F associated with the requesting line track is energised. Assuming that line track 1 made the request, G212 will open causing 23*f*1 to be energised, 23*f*11·1 to be at zero potential and 23*f*11·0 to be at a positive potential. As before G302 will open, 31*f*1 will be energised and search for a free storage track will be made. Eventually 31F will have 31*f*3 energised and the PA pulse will cause 21*f*1 to be energised so that transfer takes place from line track 1 via the read head, 61A, G601, G602, G603 and one of the gates G605—G608 or equivalent gate to the record head of the selected storage track. The PF pulse, which is generated in the element position preceding the line track section to be used for recording the tens group of the storage track in use, opens one of the gates G420, G421 or equivalent gate and the number indicated by the position of 31C is registered in telegraph code in 41R. This is described more fully in the booking section. Briefly, there are ten groups of gates like the two fan-like groups shown, and the ten terminating gates G403—G404 are each strapped to one or more of the gates G405—G409 according to the arrangement of marks M in the telegraphic code of the number each represents. For instance, if 31*c*1 is to be registerd (i.e. 1), then G402 and G403 open, and the coding for 1, say MMMSM, is transferred by permanent strapping G405, G406, G407, G409, i.e. to 41R 1, 2, 3 and 5**, position 4 being omitted for the space S in the fourth position.

The WT waveform which follows opens G425, G413 and G412 for the pattern in 41R to be stepped and read, element by element, by 41F. 41F reads **41*r*1 via G410 or G411** (for M or S as required) at time *t1*, the pattern being stepped at time *t2* via G412. G631 opens and closes in accordance with the information read by **41*f*1 and, since it has been assumed that 23*f*1 is energised, the tens group information is recorded on line track 1 by means of G632 and G633**.

The PG pulse, generated in the element position between the sections of track which record the tens group number and the units number, opens one of the gates G422, G423 or equivalent gate and the number indicated by the position of 32C is registered in telegraph code in 41R. Again 41F reads the information, element by element, and the recording is made by means of G631, G632 and G633. The PD pulse at the end of transfer opens G201 to energise **21*f*2, G322 to energise 31*f*4** and G116 to energise 11$f$3. As described above, as soon as the booking operation is complete, G221 opens to energise 23$f$11, followed by G323 which opens to energise 31$f$5, and the common equipment is ready to perform a further transfer operation.

Assume that the end of message character is still not received before the predetermined position of the distributor element for the next section of the message on the line track under consideration. When this position is reached, G117 opens and 11$f$2 is energised, the latter causing G120 to open and the SRS for this line track becomes positive. A free storage track is again allotted for the message by the track selector and transfer takes place. This time, because one of the gates G703, G704 or equivalent gate is open, PE opens G706 to energise 72$f$1. PE is more particularly concerned with the booking function, and coincides with one of the WB pulses used for recording "end of message." The new track information is recorded into the appropriate line track by means of 41R, 41F and the gating arrangement G631, G632 and G633 but at the same time the previous track information is read into 71R by means of G707, the pattern being stepped by means of G708; 71R has one position more than the number of elements to be recorded for there will be a stepping pulse after the last element has been read into 71R11, the final position being that the elements denoting the tens group of the track will be in 71R1—5 and the units in 71R6—10. It should be noted that, whilst the storage track information is being read off the line track, G630 and, hence, G603 will be closed by WT so that this information is not recorded on the new storage track. The PD pulse at the end of transfer, as previously described, causes 11$f$3, 21$f$2 and 31$f$4 to be energised but now, since 72$f$1 has been energised, G709 opens and 71$f$1 is energised. Although no booking operation will have taken place, the next PC pulse cannot open G221, 71$f$4 no longer being positive, and 23F remains at the position indicating the line track which has just had its contents transferred.

With 71$f$1 energised, G303 opens and 31C commences to step under control of the PS pulses. G710 is composed of a control from 31C1 together with five controls from 71R1–5, these five controls being the telegraph code of 1. For example, if 1 is MMMSM, the controls of G710 will be 31C1, 71$r$1·1, 71$r$2·1, 71$r$3·1, 71$r$4·0 and 71$r$5·1. There will be nine other such gates attached to G711 these gates being composed of the other positions of 31C and the corresponding telegraph codes. Thus, when 31C has stepped to the position indicated by the code given by 71R1–5, G711 followed by G712 will open to energise 71$f$2. G303 is closed and 31C no longer steps but G311 opens and 32C begins to step. G713 is similar to G710 but the controls are 32C1 and five controls from 71R6–10, these five controls being the telegraph code of 1. Nine other such gates are attached to G714 being composed of the other positions of 32C and the corresponding telegraph code controls from 71R6–10. When 32C has stepped to the position indicated, G714 followed by G715 open to energise 71$f$3 so closing G311 and stopping 32C. 31C and 32C will now indicate the position of the preceding track used to record the message being considered. The setting up of the selector will be complete before the next appearance of WT so that when the new storage track information on the line track is in a position for reading, the selector will have been set to the desired position, 23F being still in the correct position. The PB pulse in this revolution of the drum will open G702 to re-energise 72$f$2.

When the WT waveform is generated, G629 opens, opening G628 and G603, so that the number of the storage track just used in the transfer, and recorded on the line track during the previous revolution, is read from the correct line track via G602 and G603 and one of the gates G605—G608 or equivalent gate to the record head of the track indicated by the position of 31C and 32C, i.e. the storage track used for the preceding part of the message. The PD pulse following the recording opens G716 to energise 71$f$4 and the following PC pulse can now open G221 to energise 23$f$11, which opens G323 to energise 31$f$5, and the common equipment is now in readiness for dealing with a further transfer, and possible booking operation.

The operation just described continues for further extension tracks, including the transfer of the last part of the message, viz. the transfer initiated by the receipt of the end of message character. The number of the current storage track is registered in 41R and is passed via G631 to the line track concerned. This information is then recorded on the preceding storage track, in the manner described above, by setting 31C and 32C to the correct position using 71F, 72F and 71R. At the completion of the recording, G716 is opened by PD to energise 71$f$4 and the following PC pulse then opens G221 to energise 23$f$11. 23$f$11 energised opens G323 to energise 31$f$5 and the circuit is in readiness for dealing with a further sequence of operations.

The time involved in a complete sequence of operations in connection with one transfer is three revolutions of the drum store in the worst possible case. The common equipment must be seized before transfer takes place and, since transfer always starts from a PA pulse, one revolution maximum is necessary before transfer commences. Transfer itself takes one revolution. When a booking is being made on the booking track, any required operation will be completed before the end of the revolution following that in which transfer takes place. Also in the same revolution, the recording of the number of the current storage track is made on the line track. Hence the maximum time required is three revolutions for the operations involved in transfer and booking. Earlier it was stated that even if 10 line tracks required transfer at the same time, the worst delay would be 30 revolutions. With the arrangement shown for 23F this is not strictly true for it is possible that line tracks already cleared could be ready for a further transfer before the later choices had been dealt with. However, this state of affairs could be obviated by an arrangement in which 23F did not search from line track 1 to line track 10 but searched from whatever position the last transfer was made.

To pass now to the booking operation, items ($d$) and ($e$), which takes place during the transfer operation. The incoming message may be less than one line track capacity in which case, when the message is transferred from the line track to common storage, the complete booking may be made in one operation. Alternatively, for incoming messages which require several tracks, when the first part of the message is transferred, part only of the booking can be made but, when the "message end" is received and the final part of the message is transferred, the completion of the booking can be effected.

A complete booking contains the following information:

($a$) Priority of the message.

($b$) Line circuit on which the message is received.

($c$) Whether or not the booking relates to a completed message.

($d$) Identity of the common storage track holding the message, or the first part of the message.

The priority, which is included at the beginning of an incoming message, is inserted in the booking by reading off the pertinent information as the first section of the message is transferred.

The line circuit number is obtained from that part of the common equipment which determines which line circuit shall be allowed to transfer the contents of its line track to the common storage.

The message completion information is obtained from that part of the line circuit which is used to read characters of the incoming message to determine when the "end of message" character is received.

The identity of the storage track which receives the first part of the message is obtained from that part of the common equipment which allocates the free track to be used.

It should be understood that items (*a*), (*b*) and (*d*) may be recorded on the booking track when the first part of the message is transferred irrespective of the receipt of the end of message character; item (*c*) is inserted only when the message is complete. When the message is less than one line track capacity the completion may be inserted quite simply when the other items are recorded, but if the message takes several tracks, the completion data has to be inserted by searching for the initial booking made by the particular line track. Because of the two different methods by which completion of the booking must be carried out, it is necessary to include in each line circuit equipment means by which it can be recognised that a message has taken one or several storage tracks.

Before passing on to the detailed description, it is desirable to outline the principal functions of the intermediate register 41R, which plays a very important part in the booking operations.

Its functions are:

(1) To assemble the incoming line circuit number, and the first storage track number, both tens and units, in parallel form, and to transmit them in serial form to the carrier track, previously referred to, for the booking operation;

(2) To detect all bookings regarding a particular line so that a "message completed" mark can be added to all such bookings, in connection with messages requiring extension tracks;

(3) To detect message track (store) number used, to allow this information to be added in the record of the line track.

This function is appropriate to the sections on transfer.

The method of dealing with the booking operation will be described in two parts. In the first it will be assumed that the incoming message takes one track only and in the second it will be assumed that the incoming message requires several storage tracks. Some amount of repetition of the previous description will inevitably be incurred.

(d) *Booking a message which takes one track*

For this case the end of message character will be received on the incoming line before the associated line track is full. The multi-stable register 12F, in the line equipment, is used to detect this particular character, which will be assumed to be SMSMM with the additional proviso that the stop element is a space. The latter is to ensure that even if a character in a coded message translates to the end of message character, no false recognition can take place.

Initially, **11*f*4 and 12*f*1 in the line circuit will be energised. As the message arrives, the individual characters (each element of which has a 20 ms. duration) are examined by means of the timed pulses TS30, TS50 . . . TS130 which occur at the centre of the received elements. The gates G103 and G104 together, G105 and G106 together, are arranged to respond only to the opposites of the elements which compose the end of message character, so that for any other character whatever, 12*f*4 will be energised by at least one of the time scale examination pulses. At TS132 therefore, i.e. 132 ms. from the beginning of a character start element, 12*f*1 will not have been energised, G108 will remain closed and 12*f*2 will not be energised. When the time scale returns to its rest condition, TSO energised, G109 and G102 will open to 12*f*4 and 12*f*1 will be re-energised. This operation continues until the end of message character is received; for this character, neither G104 nor G106 will open and 12*f*4 will not be energised so that 12F remains at position 1, and at TS132, G108 will open to energise 12*f*2**.

With **12*f*2 energised, G110 and G111 are opened causing 11*f*1 to be energised. The latter indicates that the message contained in the associated line track has to be transferred to one of the free storage tracks and also that a booking has to be made, 12*f*2 indicating that the booking is for a completed message. As described previously in the sections dealing with the transfer operation, as soon as the common equipment is free, the requesting line energises an associated position of 23F, viz. 23*f*1 energised for line 1, 23*f*2 energised for line 2, etc., and the free storage track selector, 31C and 32C is caused to move to a position indicating a free track. When these functions are completed, 31*f*3 will be in an energised condition and, in consequence, when the next PA pulse, which indicates the beginning of a track, is generated, G204 is opened and 21*f*1 energised. 21*f*1 is the control which permits the message on the track indicated by 23F to pass to the storage track indicated by 31C, 32C**.

Continuing with the booking operation, suppose that the line track which is going to transfer its contents is the track associated with line 1, i.e. **23*f*1 will have been energised. With 11*f*1 and 23*f*1 energised, G205 and G206 open causing the BRS control (Booking Required Signal) to become positive so that, as the message is being transferred via G601, G602, G603 and one of the gates G605—G608, the PB pulse, which occurs at the beginning of the storage section used for recording the message priority, opens G207 to energise 22*f*1, so opening G609. Thus, as the priority information is read off the line track, not only does it pass to the free storage track but also to the booking carrier record head. It should be noted that the normal carrier circulation of read and re-record via 63A, G616 and G614, G615 and G613 is cut off at G615 and G616, whilst G611 and G612 are opened, in each case by removal of 22*f*5. The PB pulse referred to also opens G112 to energise 12*f*3 in readiness for recording the completion of the message in the appropriate part of the booking. The reason for this further stage in 12F** will be included in the description which deals with a message requiring more than one storage track.

The PC pulse following the priority section of the message opens G208 and energises **22*f*2, so closing G609. However, G617** is opened in readiness for recording the line circuit number in the booking. Here it will be explained how this item of information is registered in telegraph code in readiness for recording.

Gates equivalent to G401 and G402 are used for each of the outputs **23*f*1—23*f*10 and are connected to gates equivalent to G403—404, these gates representing the numbers 1–0. From G403, G404 and equivalent gates, connections are taken, as necessary, to G405—G409 in accordance with the telegraph codes of the numbers. For example, if the telegraph code for 1 is MMMSM, connections would be taken to G405, G406, G407 and G409, the connection to G408** being omitted because of the space in the fourth element position.

Since it was assumed in the foregoing that the contents of line track 1 are being transferred, i.e. **23*f*1 is energised, the PC pulse which energises 22*f*2 also opens G401 and the telegraph code for 1 is set up in 41R, i.e. 41*r*1, 41*r*2, 41*r*3 and 41*r*5 will be energised and 41*r*4 will be non-energised. The *t*1 pulses applied to G410 and G411 occur at the beginning of each element of the recording and the *t*2 pulses applied to G412 occur between the *t*1 pulses. Thus, when IPC waveform becomes positive, G410 will open since 41*r*1 is at mark, and 41*r*1·1 is positive, 41*f*1 will be energised and G618 will open, causing the first element of the line track number to be recorded via G610, G611, G613 and the carrier record head. Since G413 is open owing to 22*f*2, *t*2 will open G412 and the pattern in 41R will be stepped so that now 41r1, 41r2 and 41r4 will be energised and 41r3 and 41r5** non-energised.

The next *t1* pulse opens G410 and 41f1 remains energised and the second element is recorded via G611 and G613. Again *t2* steps the pattern so that 41r1 and 41r3 will be energised, the other positions being non-energised and with 41r1 energised, G410 is again opened at *t2*, and 41f1 remains energised.

At the next stepping of 41R, however, 41r1 is non-energised, and the inverter 41X causes 41r1·0 to be positive, so that at *t1*, G411 is opened, 41F changes to position 2, and G618 does not open. The absence of signal from G610, however, is inverted to a positive signal in 61X, and passed by G612 and G614 to the carrier track recording head to record a space. In this way, the whole of the code for the line circuit number is recorded.

The PC pulse at the end of the line circuit number storage section opens G209 to energise 22f3. At the same time, one of the gates G414, G415 or equivalent gate opens so that the tens digit of the storage track allocated, denoted by the position of 31C, is registered in 41R.

Before this information is used however, it is necessary to record the completion mark, which is accomplished by means of G619 and G620. The PE pulse is in the appropriate position—see Fig. 8—for the recording to be made and, since 12f3 for line 1 (i.e. 12f3(1)) is energised, the control 12f3(1) is positive and, therefore, both G619 and G620 will open and the recording will be made via G610, G611, and G613. For the duration of the PE pulse, G618 will be closed so that the condition of 41F plays no part in the recording of the completion information.

During the next positive waveform IPC, the contents of 41R, which, as will be recalled, give the telegraph code of the tens digit of the storage track in use, are passed to the carrier track record head in a manner similar to that described for recording the line track number. For this new recording 22f3 opens G617 to allow the state of 41F to be recorded via G618. The PC pulse at the end of this item of information opens G210 to energise 22f4 and the same PC opens one of the gates G416, G417 or equivalent gate so that the telegraph code of the units digit of the storage track in use, denoted by 32C, is registered in 41R. As for the previous information, this information is recorded via G618, 22f4 being responsible for opening both G413 and G617.

The next PC pulse opens G211 and G202 to energise 22f5, so restoring 22F to its rest condition. 22f5 energised closes the gates G611 and G612 preventing further new information from passing to the carrier track but at the same time opening G615 and G616 so that the booking now recorded may circulate in synchronism with the storage sections of the booking track. The booking must now be passed from the carrier track to the booking section indicated on the booking track.

An element at the beginning of each booking storage section serves as a distributor for storing bookings in the received order. One only of these elements, namely the one at the beginning of the storage section to receive the next booking, is a 1, all others being 0. Thus, the booking on the carrier track must circulate until the storage section marked by 1 is reached, when transfer of the booking must take place. At the same time the 1 must be replaced by 0, to indicate that this section is not to be used for the next booking, and the 0 in the next distributor position changed to 1. This operation is included in the description of the transfer booking operation which follows.

When 22f1 was energised by the PB pulse, 51f1 was energised also to indicate that a new booking is being passed to the carrier track. When the 1 in the booking distributor position is read, coinciding with a WQ pulse, the control IBT becomes positive so that G506 will open to energise 51f2, which in turn energises 52f1. The same WQ also opens G621, thus causing the 1 which is read from the booking track to be recorded as 0. At the end of the WQ pulse, G623 and G624 open so that the information from the read head of the carrier track passes via G623 and G625 or G624 and G622 to the correct storage section of the booking track.

Pulse 51f2 is a slowly rising pulse, to prevent it combining with the WQ pulse at this stage to open G507 and thus pass 51F straight into position 3. The next WQ pulse, however, i.e. at the end of this booking section, opens G507 which energises 51f3 and so closes G623 and G624. Also WQ opens G626 so that, although 0 is read for this distributor element position, 1 is recorded. The following WB pulse opens G508 to energise 52f2 and 51F and 52F are now back to their initial conditions. The booking has now been transferred and the distributor moved to the next storage section in readiness for completing a booking for a further incoming message.

12F is returned to 12f1 energised by the PD pulse at the end of the transfer revolution opening G113. The same PD pulse opens G114, all other controls on this gate being positive, to energise 11f4. PD also transfers 31F to 31f4 energised and, as soon as all operations including booking have been completed, 23f11 will be energised and the circuit is in readiness to deal with a further transfer operation. In practice, the inter-dependence of the various re-setting controls just described may require the use of the staggered *t1*, *t2*, *t3* pulses to secure correct sequential action.

(e) *Booking of a message requiring several storage tracks*

In this case, the end of message character will not be received during the first line track portion of the message. Instead it is necessary to effect transfer before the track is completely filled. During the recording of a message on the line track, a distributor element is progressively made 1 to indicate the location for recording of the next character. To ensure that the message length does not exceed the line track capacity before transfer takes place, an indication is given in advance that storage is required by arranging that a distributor element becomes 1 for a storage section which is a predetermined number of storage sections from the end of the available track space. The succeeding storage sections are capable of dealing with other received characters until transfer can take place. The pulse coinciding with the predetermined distributor element position is PX.

When the condition of 1 in this element position is satisfied, G115 will open to energise 11f1. As described above, 11f1 energised indicates that a transfer has to be made but, since 12f2 is non-energised, it is known that, although a booking is to be made, it is for an incomplete message. Operations whereby transfer takes place and the priority, line track and storage track information are passed to the carrier track occur as for the previous case. However, there is a variation in respect of the completion element. For the latter, when PE occurs, G619 remains closed so that this element is recorded as 0, not 1 as in the previous case.

The booking recorded on the carrier track will pass to the booking track, again as previously described.

A further variation occurs in the operation of 11F. When the PD pulse is generated at the end of the transfer revolution, 12f3 will not be in an energised condition so that G116, not G114, opens so causing 11f3 to be energised. Again 23F returns to 23f11 energised at the end of the operation.

It is appropriate at this stage to give the reason for the inclusion of G112 and 12f3. An interval can elapse between the time a line track applies for transfer and the time that the common equipment is free to perform the necessary operation, and it is possible for the end of message character to be received before transfer takes place. Should this character be received before the recording of the booking on the carrier track commences, 12f3 will be energised by PB so that a completion can be effected. Failing this, completion cannot be carried out until a further transfer operation during which 12f3 can be energised.

Carrying on with the description assuming that the end of message character has not been received at this stage, assume that a second line track section of the message is received. Once again the distributor element on the line track has moved to the predetermined position before receiving the end of message character. G117, not G115, opens and 11f2 is energised. 11f2 causes the common equipment, when free, to allocate a free storage track to permit transfer to take place but, since G112 and G207 remain closed, 22f1 is not energised and no changes take place in the booking circuits 51F, 52F and 41R. The PD pulse at the end of transfer opens G116 and 11f3 is energised once again.

The operation described continues for further line track sections of the message, transfer taking place but no changes being made in the booking arrangement, until eventually the end of message character is detected causing 12f2 to be energised. With 12f2 energised, G119 opens to energise 11f2 and again a free track is selected. 22f1 remains non-energised. Transfer is initiated by 11f2 and, when the PB pulse is generated, 12f3 is energised to indicate that the booking associated with the message undergoing transfer should have a completion mark. The booking previously passed to the booking track includes the line track number, so that it is unnecessary to make use of the carrier track; knowing the line track from which the message is passing to storage, it is sufficient to search the booking track for incoming bookings made by that line track and ensure that each has a completion mark entered in the appropriate element.

G509 (or one of the equivalent gates for the other line circuits) is opened and 53f1 energised. When the PD pulse is generated, G511 is opened and 53f2 energised, this stage being included to ensure that the search for the line track number starts at a definite place, carries on for one drum revolution and then ceases. The succeeding WQ pulse opens one of the gates G418, G419 or equivalent gate to register the line track number, given by 23F, in 41R. During the WL waveform, which coincides with the line track number storage section on the booking track, G424, G413 and G412 open and the pattern registered in 41R is stepped along, the elements being read in turn by 41F. (It should be noted that 41F will operate during the IPC waveform when WL is not present but no stepping or comparison takes place at times other than WL present.) G512 and G513 are arranged so that either of the gates will open when the output of 41F is opposite to that from the reading head of the booking track. Thus, G515 will open and 54f1 be energised when the line track number in the booking track is different from the line track number registered in 41R and for which search is being made. When the WB pulse occurs, if the booking line track number is not the correct one, 54f1 will be energised and G627 will remain closed. However, for the same line track number, G515 will not open and 54f2 will remain energised and, in consequence, the WB pulse will open G627 causing a completion mark to be inserted, irrespective of whether or not one was already present. The next WQ pulse again opens the gate of G418, etc., previously opened and the line track number is re-registered in 41R. Comparison again takes place for the next booking storage section and the completion mark entered, if necessary. The registering of the line track number in 41R, comparison by 54F of the contents of 41R and the output of the booking track reading head and control of the insertion of the completion mark for the remaining bookings takes place as described above.

When a complete revolution has been made by the drum, the PD pulse opens G516 to energise 53f3. In the meantime, the PD pulse at the end of the transfer revolution will have caused 11f4, 12f1 and 31f4 to be energised but no further transfer operation can have started because 23F is still off normal. When the booking operation is complete, i.e. 53f3 energised, the gate controlling 23f11 is opened, 23f11 is energised and the circuit is in readiness for dealing with further transfer and booking operations.

Arrangements having now been described whereby incoming teleprinter messages may be transferred to a common store, and a booking made of particulars relating to them, the necessity arises for the further disposal of the stored messages. In the system being described it is assumed that this is under the control of an operator, or one of a group of operators, who must be informed of the highest priority message in store, and to what destinations the associated message has to be transmitted, so that an outgoing booking can be made for effecting transmission.

The features now to be described are (*f*) and (*g*) (above).

For convenience in the description of the required connecting link it will be assumed that the addressees are given in that part of the message which follows the priority designation and that the character following the addressees and dividing them from the text is a full-stop. The addressees and full-stop part of the message is referred to as the "first line" in the following.

At a switching centre it is possible that there may be several operators. Thus, two approaches are possible. Firstly, when the highest priority booking has been selected, whilst the corresponding first line is being passed to a particular operator, further bookings may be selected and the necessary information passed to other free operators. Such an arrangement means that each operator will have a track selector so that the first line may be passed to the operator at the same time as other first lines are passing to other operators. The alternative arrangement is one in which, when the highest priority booking is selected, no further bookings are selected until the first line of the selected booking has been passed to one of the operators. This would make possible a link arrangement similar to that described for the "transfer-in" arrangement of (*b*) and (*c*) above. Since the number of operators in a practical system would be small and the time involved in presenting the first line to an operator could be comparatively long, the first of the two alternatives is the one which is preferred and which will be described. However, it should be understood that the circuits given could be modified quite easily to give the link arrangement; a brief description of the changes involved will be given at the end of the circuit description.

A brief description will first be given of the diagrams involved, comprising Figures 9–15, together with Fig. 8, which shows the pulses and waveforms involved (not all of these are required in the current description) and also the allocation of elements on both the storage and incoming booking track.

Figure 9:
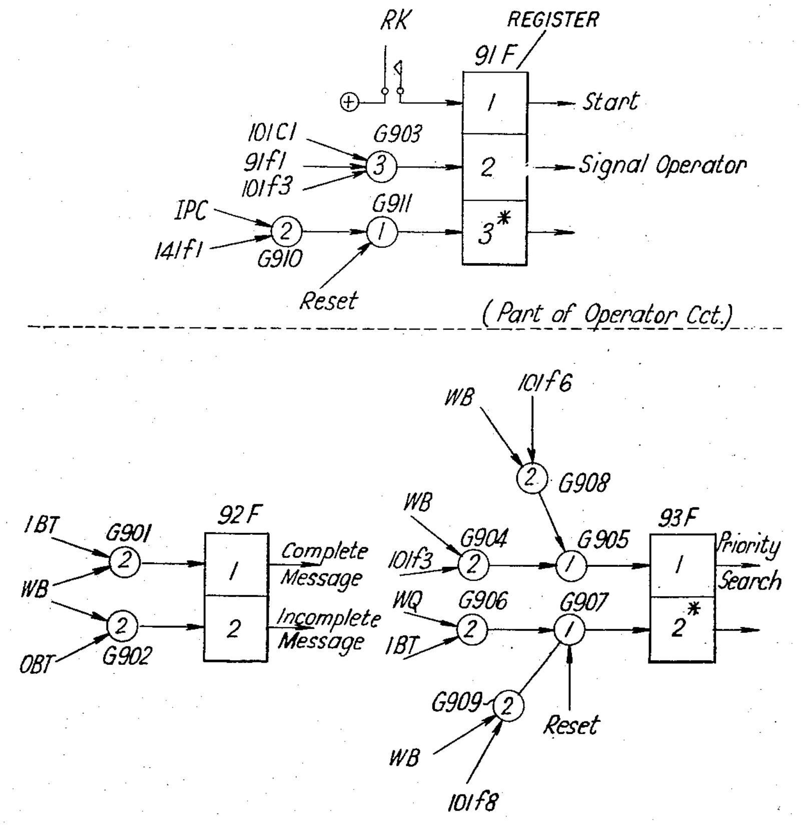
Figs. 9–15 are control circuits used in determining the highest priority of all messages in the common store, a link circuit for connecting an operator to the section of the store which contains this particular message, and circuits for causing the message (or a significant part of it) to be brought up before the operator on a teleprinter for further action.

In Fig. 9, 91F is a multi-stable register circuit individual to each operator; 92F is a circuit used to determine whether a booking is for a completed message or a message which is still being received; 93F is a circuit which is used to indicate that the search for the highest priority booking is being carried out. Further use is made of 93F to give useful control arrangements for the operation of 101F.

Figure 10:
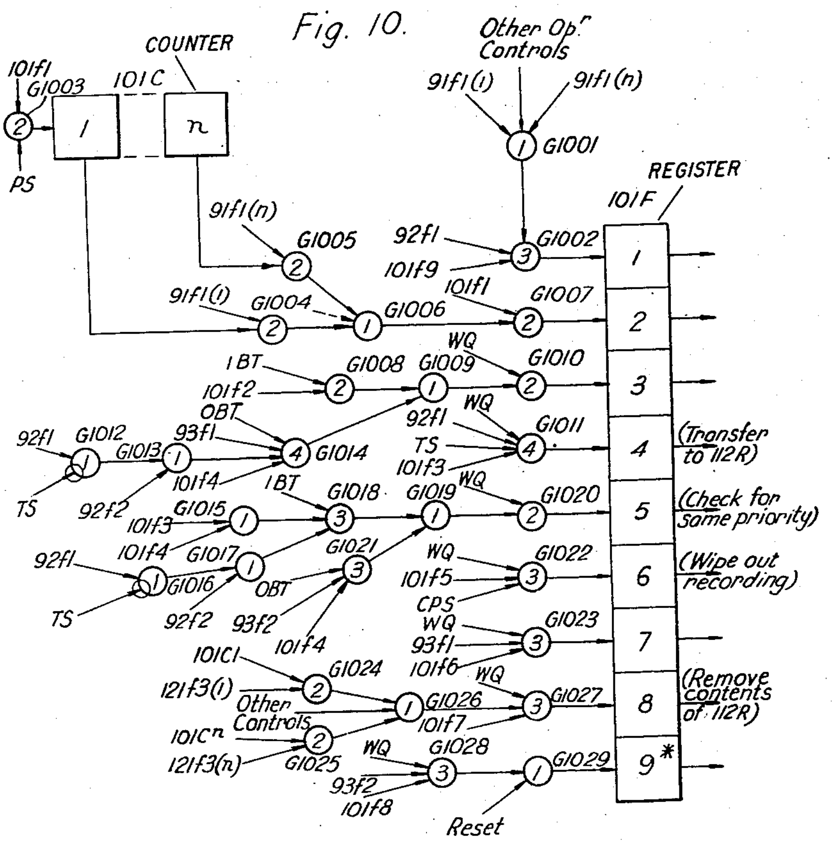

In Fig. 10, 101F is a multi-stable register which is used in controlling the search for the highest priority booking and then in causing the selected booking to be erased from the booking track. 101C is a counter with one position for each operator.

Figure 11:
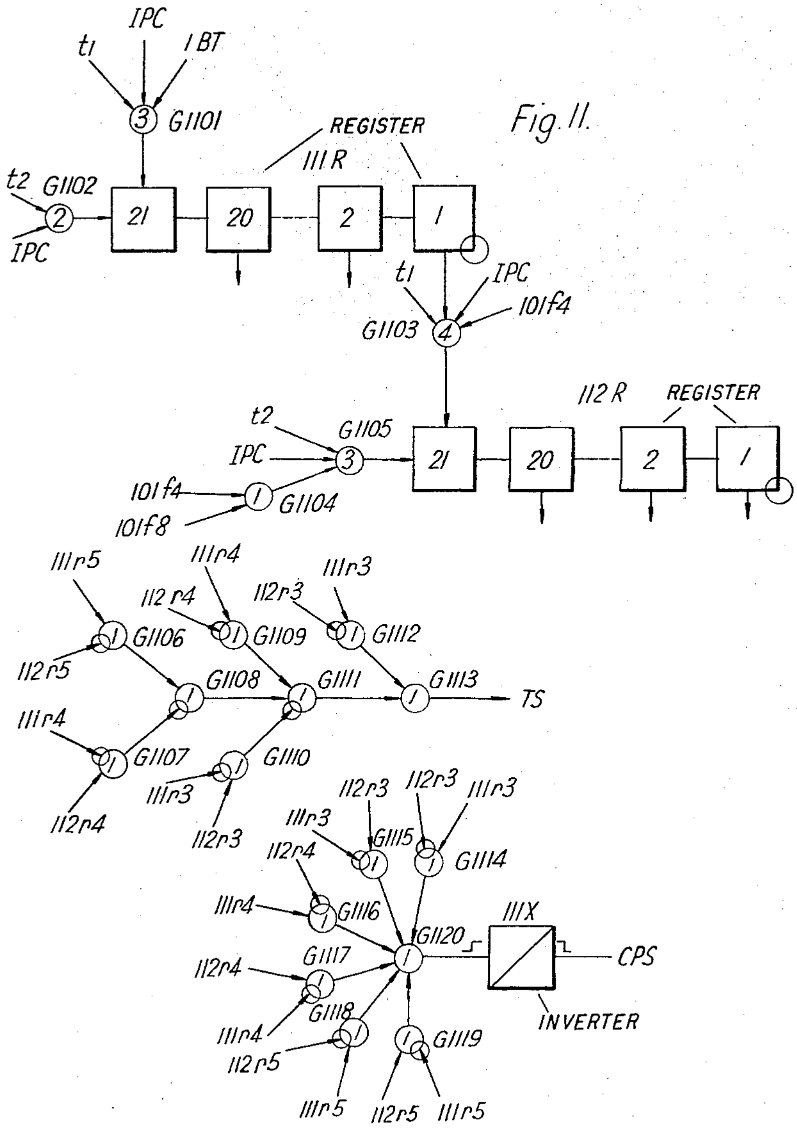

In Fig. 11, 111R is a pattern movement register which is used for temporarily storing the booking information so that a comparison can be made with the contents of 112R, a pattern movement register which is used to store the highest priority booking found during the search. TS is a signal which indicates that the priority of a booking contained in 112R is higher than that of the booking in 111R; CPS is a signal which indicates that the booking in 111R has the same priority as the booking in 112R.

In the above, all circuits except 91F are common to all the operators, i.e. are associated with the incoming booking track. The circuits which follow are individual to each operator.

Figure 12:
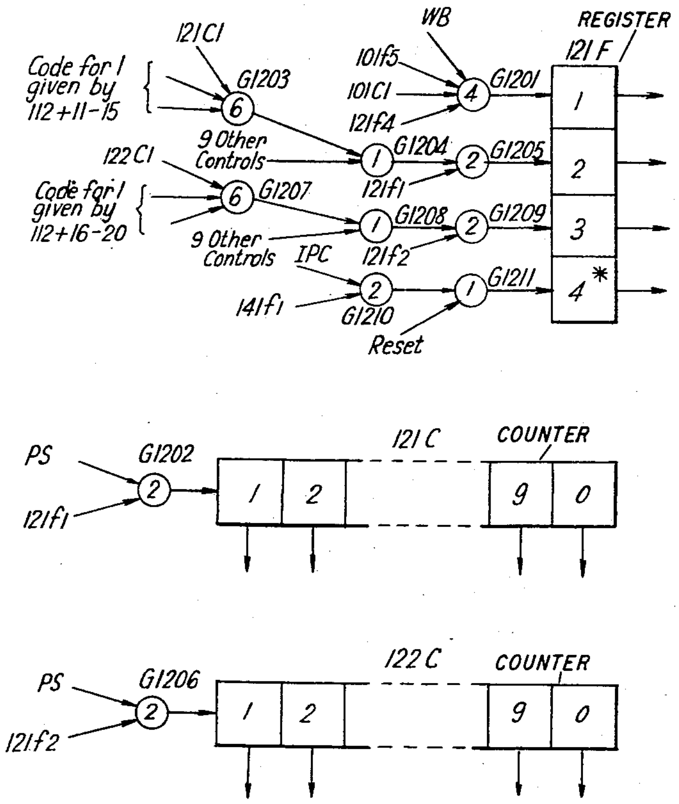

In Fig. 12, 121F is a multi-stable register which is used to control the search for the storage track indicated by the selected booking. 121C and 122C are counters which in combination define the 100 storage tracks (cf. 31C and 32C of the previous description).

Figure 13:
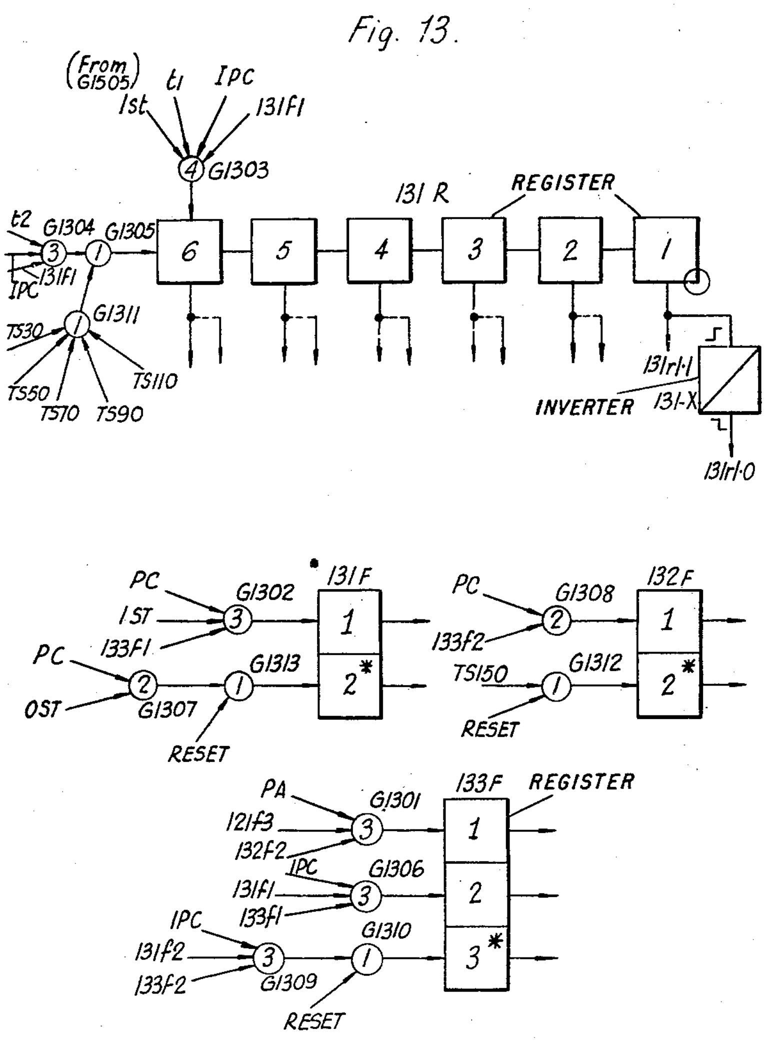

In Fig. 13, 131R is a pattern movement register which is used to store the individual characters of the first line as they are read from the storage track and pending transmission to the operator. 131F is a circuit used to control the reading off of these characters; 132F is a start-stop circuit for controlling the time scale used in transmitting to the operator the character stored in 131R. (N.B. The time scale is not shown, for it is similar to that previously described for reception. The TS values on this figure all indicate outputs from the time scale, the figures indicating the number of milliseconds from the starting of the time scale.) 133F is a circuit which is used to control the recording of the distributor element which denotes the next character to be read off the drum.

Figure 14:
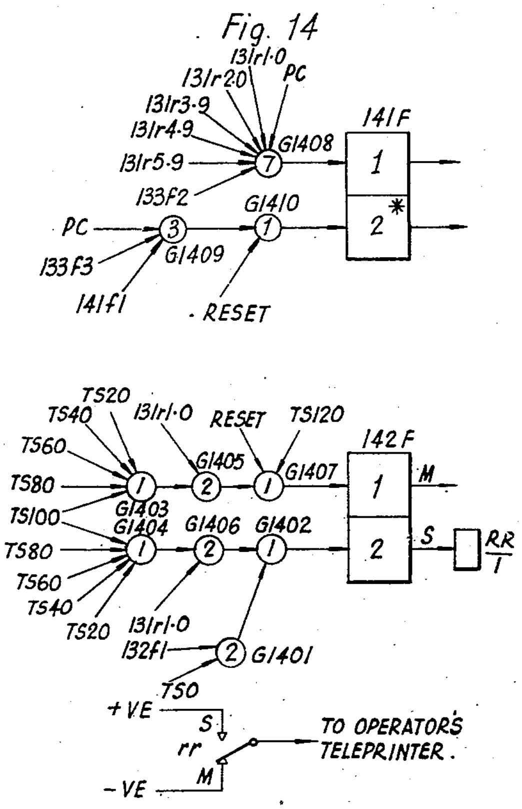

In Fig. 14, 141F is a circuit which checks each character as it is read off the drum, the object being to look for the full stop which occurs at the end of the first line. 142F is the circuit used for controlling the relay which transmits the characters in the first line to the operator.

Figure 15:
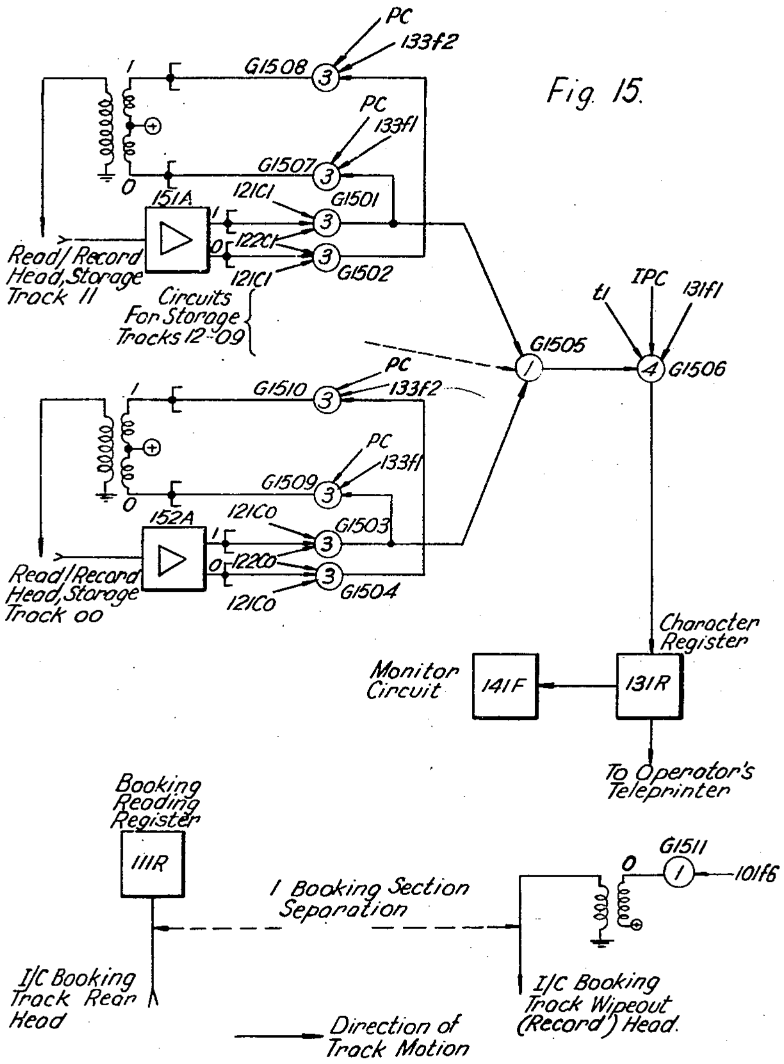

Fig. 15 illustrates the manner in which the first line of the selected storage track recording is passed via the track selector (gates controlled by 121C and 122C) to the character register, 131R, and the character check, 141F. The arrangement for changing the distributor elements as the characters are read from the storage track is included. Also illustrated is the association of 111R with the booking track together with the means for wiping out the selected booking.

(f) *Selecting the highest priority booking*

An operator free to accept a booking will operate an operator ready key, RK, Fig. 9, which will cause 91*f*1 to be energised. There will be a 91*f*1 control from each operator to G1001 so that, when one or more operators are ready to receive a booking, G1001 is opened and together with 101*f*9, which at this time is energised, prepares G1002.

As will be remembered, when a message has been completely received the element corresponding to the WB pulse has a "1" recorded in it, the similar elements of incomplete messages or booking sections in which no entries have been made having a "0" recorded. Thus, until there is a booking requiring attention G901 cannot open to energise 92*f*1. However, when there are complete messages awaiting attention, G901 will open for the WB pulse of a completed message causing 92*f*1 to be energised. 92F is thus caused to examine all bookings for completeness or otherwise.

With a booking ready for attention, G1002 opens and 101*f*1 is energised. 101*f*1 applied to G1003 causes 101C to step under control of the stepping pulses PS. 101C has one position for each operator, and it will continue to step until it arrives at a position in which a 91*f*1 control has been energised, when one of the gates G1004 or G1005, or similar gates for other operators, will open followed in turn by G1006 and G1007 causing 101*f*2 to be energised, de-energising 101*f*1 to stop 101C on the position reached. It can be seen that even when several operators are ready to receive bookings, the first reached by 101C will cause the counter 101C to stop and, as will be seen, this allows the selected booking to pass to the chosen operator.

Now it is necessary to choose the booking of highest priority and the booking of that priority which has precedence due to earlier time of arrival. In the section dealing with the incoming booking, it was explained that a distributor element WQ, being "1," denoted the booking section to take the next booking. Hence the next booking in rotation after this point will be the earliest booking made. (N.B. Bookings are made serially in time on the booking track, blank spaces due to removal of earlier bookings not being filled out of turn.) It should be understood that between the next section to receive a booking and the earliest made booking requiring attention there will be a number of sections still awaiting bookings. To give the correct precedence, the search for the highest priority booking must start at the WQ distributor element which is "1." When this is reached, G1008, G1009 and G1010 will open causing 101*f*3 to be energised. With 101*f*3 energised, the booking request signal, 91*f*1, from a particular operator can be removed. The operator is denoted by the position of 101C and, if one considers operator 1, 101C will cause G903 to open to energise 91*f*2. The latter can be used to light a lamp or give any other signal to inform the operator in question that the first line of a completed message will shortly be delivered to this operator's equipment. The WB pulse which follows the energising of 101*f*3 opens G904 and G905 causing 93*f*1 to be energised. The output of 93*f*1 is used to indicate that search for the highest priority booking has commenced and, as will be seen, is used in the further control of 101F.

Referring to Fig. 11, the information in the character positions of the booking track is constantly read into 111R via G1101, the pattern being stepped via G1102 so that, when a WQ pulse occurs, the information in 111R will be a complete booking. 111*r*1–5 give the priority, 111*r*6–10 give the line circuit number (not used in this part of the operation) and 111*r*11–15 and 111*r*16–20 give respectively the tens and units designation of the storage track which holds the first part of the message and hence the first line. The reading into and the stepping of 111R take place only during IPC; there is no necessity to store the intervening elements of a booking. The control 1BT applied to G1101 is the "1" information control from the booking track reading circuit.

For simplicity, it is assumed that the priority of messages is given in binary values, the higher the binary number the greater the priority. The least significant element will, during WQ, appear in 111*r*5. Since three binary elements will give up to 7 priorities, it will further be assumed that this number is sufficient so that 111*r*3–5 will give the required information. Of course the number of priorities could be increased to 31 using the five available elements. This would simply require an extension of the gating networks providing TS and CPS. The arrangement of gates G1106—G1113 giving TS is arranged so that when a priority registered in 111R is higher than a priority registered in 112R, TS will become positive. Similarly the gating arrangement G1114—G1120 and the inverter 111X is arranged so that when the priority registered in 111R is the same as the priority registered in 112R, CPS will become positive.

Continuing with the circuit operation, if when the WQ pulse occurs, 111R contains a higher priority than 112R, as must be the case when the first booking at the commencement of a search is registered in 111R, TS will be positive. If 92*f*1 is energised, indicating that the booking is for a completed message, G1011 opens and 101*f*4 is energised. Should the booking be for an incomplete message, 92*f*1 will not be energised and G1011 could not open. However, for the first completed message G1011 will open and 101*f*4 will be energised. The latter prepares G1103 so that as the next booking is read into 111R, the information previously contained in 111R is read into 112R via G1103, the pattern being stepped by means of G1104, opened by 101f4, and G1105, so that, when the next WQ pulse occurs, a new booking will be stored in 111R, the one previously contained by 111R now being registered in 112R. Several different actions are now possible. The new booking in 111R may be a higher priority than the one in 112R, but may or may not be for a completed message or it may be for a lower priority, or again for either a completed or an incomplete message. The various actions when WQ occurs are summarised as follows (considering the priority in 111R). (N.B. In what follows, the statement that a certain gate is closed by such and such control implies the absence of such control used normally to open the gate. This must not be confused with an inhibitory control, the presence of which closes the gate in all circumstances.)

(1) Higher priority, completed message booking. Neither G1012 nor G1013 can open due to the inhibition by TS and to 92f2 respectively, and 101f4 remains energised so that the new booking in 111R will pass to 112R replacing the one already in the latter.

(2) Higher priority, incomplete message booking. (OBT on G1014.) At this time 92f2 must be energised so that G1013 opens, 92f1 closes G1011, and 101f3 is energised once again.

(3) Lower priority, completed message booking. G1011 is closed by TS; the TS inhibition on G1012 is removed so that the latter gate opens and 101f3 is energised via G1012, G1013, etc.

(4) Lower priority, incomplete message booking. G1011 is closed by both TS and 92f1; G1013 is opened by 92f2 causing 101f3 to be energised.

In all the above cases, 101f5 cannot be energised since G1018 and G1021 are closed by 1BT and 93f2 respectively.

From the above summarised conditions it can be seen that 101f4 will be energised only for completed message bookings of a higher priority than that contained in 112R. This occurs if either 101f3 or 101f4 was previously energised. The search continues as described until once again the WQ pulse occurs for the distributor element which is "1." This pulse opens G906 and G907 causing 93f2 to be energised. The operation of 101F is again dependent upon the condition in which 101F is at the time of the WQ pulse, the priority of the bookings stored in 111R and 112R and also whether the last examined booking is for a completed or an incomplete message. Again the actions when the WQ pulse occurs are summarised in the following:

(5) 101F has either 101f3 or 101f4 energised and the booking in 111R is for either a lower priority, or an incomplete message, or both. G1011 is closed by either TS, 92f1 or both; G1014 is closed by 0BT (i.e. the "0" control from the booking track reading circuit). However, G1015 and G1017 will be open allowing G1018 to open, followed in turn by G1019 and G1020 causing 101f5 to be energised.

(6) 101F has 101f3 energised and the booking in 111R is for a completed message of higher priority. G1014 is closed by both 0BT and 101f4; G1018 and G1021 will be closed by the TS inhibition and 92f2 and by 0BT and 101f4 respectively. Now G1011 is open and 101f4 is energised to allow the booking contained in 111R to pass to 112R, as previously explained. When the next WQ pulse occurs, G1014 will be closed due to 93f1, which was deenergised by the WQ pulse coinciding with 1BT, irrespective of the other controls. G1011 will not open since any booking examined at this time will have been examined already and so cannot be of higher priority; also, as previously stated there will be unused booking sections between the "1" distributor element and the first encountered booking. However, G1021 will open and 101f5 will be energised.

(7) 101F has 101f4 energised and the booking in 111R is for a completed message of higher priority. G1014 is closed by 0BT and also by the control from G1013; G1018 and G1021 are closed by TS inhibition and 92f2 and by 0BT respectively. Thus 101f4 remains energised, allowing the booking in 111R to pass to 112R. the action for the next WQ pulse follows as described in (c) above.

From the above it can be seen that when all bookings have been checked for their priorities and state of completion, the booking for the highest priority completed message will have been passed to 112R. Also by starting the search from the earliest booking, the booking selected will also have precedence in time of arrival for the bookings of the particular priority. When 101f5 is energised no further search for a higher priority can take place.

Having registered the highest priority booking of the completed messages it is necessary to remove this booking from the incoming booking track so that this booking cannot be presented to other operators. The particular booking can be found by the fact that it is the first booking encountered, when searching from the distributor element which is "1," and having the priority of the booking registered in 112R.

To enable the same priority to be found, the signal CPS is used. The combination of gates G1114—G1120 is so arranged that, should any one of the corresponding elements denoting the priorities of the bookings in 111R and 112R be different, there will be an output from G1120 and the output from the inverter 111X will be zero. Conversely, when all corresponding elements are the same there will be no output from G1120 but 111X will cause CPS to be positive. As the bookings pass into 111R, for each WQ the priorities are compared until, when the priorities given by both 111R and 112R are the same, CPS being positive allows G1022 to open and 101f6 is energised. The booking on the booking track which has just been read into 111R will now have its first element one booking section past the reading head. Thus, a recording head controlled by 101f6 is located at this position so that, as the booking passes this head, the recording is removed by recording "0" in all element positions. The distributor element at the commencement of the booking section being erased is not, however, returned to 0, so that blank sections in the booking track are not filled up out of turn, but fresh bookings continue to be made serially in time.

The WQ pulse which follows opens G1023 to energise 101f7 so that the required booking only is removed, i.e. 101f6 is energised from one WQ pulse to the next. To prevent the same WQ energising first 101f6 and then 101f7, the control 93f1 has been added to G1023. The operation of 93F is such that the WB pulse, following the WQ which energises 101f6, energises 93f1 via G908 and G905. It can be seen that 101f7 is energised only when 93f1 is energised and hence G1023 will be opened by the WQ pulse following that which energised 101f6 and the necessary booking only will be removed.

Before 101F is allowed to return to 101f9 energised in readiness for a further search and removal operation it is necessary to use the information contained in 112R to set the track selector switch of the operator concerned with the current booking, i.e. the operator denoted by the position of 101C. Furthermore the booking contained in 112R must then be removed before checking priorities once again otherwise the bookings will be compared with the priority already registered.

(g) *Setting the operator's track selector and presenting the first line to the operator*

When 101f5 was energised, the required booking was registered in 112R. The WB pulse which follows this opens the G1201 gate of the operator indicated by 101C, e.g. 101C1 is a control for operator 1, causing 121f1 to be energised. The latter opens G1202 so that 121C steps under control of the stepping pulses, PS. It has been stated that 112r11–15 indicate the tens designation of the required storage track. The controls of G1203 consist of 121C1 together with 5 other controls from 112r11–15, these latter controls giving the recorded code equivalent of 1. (This was explained in the booking operations above, dealing with the recording of this information.) There will be nine other gates connected to G1204, these gates consisting of other outputs of 121C and the coded equivalents. Thus, when 121C steps to a position indicated by the tens number registered in 112r11–15, the appropriate gate will open, to open G1204 and G1205 causing 121f2 to be energised, so closing G1202 and opening G1206.

Thus 121C stops but now 122C will step under control of the PS pulses. G1207 consists of 122C1 together with 5 other controls, these latter controls being from 112r16–20 and giving the recorded code of 1; 112r16–20 contain the units designation of the required storage track. Again there are 9 other controls for the other outputs of 122C and their coded equivalents. 122C will step until the required position is reached when G1208 and G1209 will open to energise 121f3, so stopping 122C. The operator's track selector has now been set to the required track and it is possible to remove the information from 112R and restore 101F to 101f9 energised so that further bookings may be passed to operators, when required.

Depending upon the operator denoted by 101C, one of the gates G1024, G1025 or equivalent gate will open when the related 121f3 has been energised. In turn G1026 and G1027 open and 101f8 is energised. 101f8 opens G1104 so that the contents of 112R are stepped along and thereby removed. The WB pulse occurring with 101f8 energised opens G909 and 93f2 is energised. Thus, the following WQ pulse can open G1028 and G1029 to energise 101f9 in readiness for the next required search operation. 93F ensures that 101f8 is energised for the duration between two WQ pulses, as it did in the case of 101f6, used for removing the recording.

The operator having previously been advised that a completed message requires attention must now be presented with the first line of the message to indicate the desination required, to enable further action to be taken. The operator's equipment is now associated with the required storage track via a gate controlled by the outputs of 121C and 122C (see Fig. 15 which illustrates the association).

The method of reading off the required information and recording on the operator's teleprinter will now be described. It will be assumed that when the first part of the message is transferred to the storage track from the line track a "1" is recorded in element PB pulse position; this can be performed quite simply by means of a PB pulse applied to G628 in Fig. 6. This "1" is simply to give a starting point for the reading off and it will be noted that the first character will be the message priority.

With 121f3 energised, the PA pulse, which occurs at the beginning of the message, opens G1301 to energise 133f1. When the "1," mentioned above, is read, 1ST, i.e. the "1" control from the storage track reading circuit, will cause G1302 to open and 131f1 will be energised. This "1" information is obtained via G1505, this gate being controlled from the required storage track via one of the gates G1501, G1503, or equivalent, according to the setting of 121C and 122C. When this "1" is read it is necessary to record "0" in its place so that this character will not be taken out again, and also to advance the character distributor, i.e. the following distributor element must be changed from "0" to "1." This is accomplished by means of controls from 133F.

To give an example, consider that the first line of track 11 is to be passed to an operator. When "1" is read in the distributor element via G1501, G1507 will be opened by PC causing "0" to be recorded. As will be seen, when the next PC occurs with the following distributor element, read as "0," 133f2 will be energised and accordingly G1508 will open causing "1" to be recorded. 133f2 will then be de-energised so that no further action can take place until the next character is required.

It should be understood that no matter what the connections to the other operators, no false operation can take place due to the corresponding gates in the commoning arrangement. Only one operator will be connected to the track being considered and also have the equivalent 133f1 and 133f2 energised; hence the distributor elements will be changed according to the required connection conditions.

Returning to the operation when 131f1 is energised by the opening of G1302, 131f1 energised prepares G1303 and G1304 so that as the character following the marked distributor element is read, this information is passed via G1303 into 131R and the pattern is stepped along under control of G1304 and G1305. As the information passes into 131R, G1306 will be opened by IPC and 133f2 energised, the latter being used in changing the next distributor element from "0" to "1," as explained above; when this element is read, 0ST, which is an inversion of 1ST, will cause G1307 and G1313 to open to energise 131f2, so cutting off the reading circuit at G1303. The same PC opens G1308 to energise 132f1, which is the start tube of the time scale (not shown in the diagram). This time scale is used to transfer information from 131R to the operator's receiving teleprinter. The IPC following opens G1309 to energise 133f3; nothing further can happen to 133F and, hence, to 131F until the character stored has been transmitted and 132f2 energised once again.

The actual transmission takes place by means of 142F which is controlled by the output from 131R and time scale timings, TS10 etc., the figure after TS indicating the number of milliseconds from the start of the time scale. G1401 and G1402 open when 132f1 is energised so causing 142f1 to be energised to operate relay RR, the contacts of this relay causing a space, i.e. start signal, to be sent to the operator's teleprinter. At TS20, G1403 and G1404 open but only one or the other of G1405 and G1406 can open, dependent upon the element stored in 131r1; 142F will be set according to this element and the relay contacts will send this element to line. In Fig. 14, 131r1·0 is intended to indicate space and 131r1·1 to indicate mark, it being assumed that marks were recorded as "1" in the original message reception.

At TS30, G1311 and G1305 will open causing the pattern in 131R to step so that the second element will be stored in 131r1. At TS40, G1403 and G1404 open again and either G1405 or G1406 open according to the information given by the second element in 131r1. Thus, 142F is set dependent upon this element and the rr contacts transmit the information to the operator. The contents of 131R are stepped again at TS50 and the third element is now stored in 131r1. Each element in turn is examined and transmitted by 142F until when TS120 arrives all elements have been transmitted. TS120 now opens G1407 to energise 142f1 and release RR so that mark, i.e. stop element, is transmitted to the operator's teleprinter. At time TS150, G1312 opens and energises 132f2 so stopping the time scale, at the same time restoring the latter to its TS0 condition.

With 132f2 energised, the next PA pulse can open G1301 to energise 133f1. When the "1" distributor element is reached, and this will now be before the second character, G1302 opens to energise 131f1 and the character is read via G1303 into 131R, the pattern being stepped via G1304 and G1305. Again 133f1 and 133f2 cause the "1" element to be changed to "0" and the next "0" element to be changed to "1." Further operation for transmitting this character to the operator is as described above and so on for further characters, until the full stop is read at the end of the first line. This part of the operation will now be described.

141F is the circuit used for testing for the full stop recorded at the end of the first line so that reading can stop when the priority and all destinations have been recorded on the operator's teleprinter. It will be assumed that the code for full stop is SSMMM, that is, the recording will be 00111, assuming that marks have been recorded as "1." Thus, when full stop has been recorded in 131R, 131r1 and 131r2 will be non-energised but 131r3–5 will be energised. During the PC pulse after a character has been read into 131R, an examination is made of the contents of this register; 133f2 energised defines the particular PC pulse required. G1408 is controlled by PC, 133f2 and five outputs from 131R, these outputs being those for the full stop character. Thus, G1408 can open only when a full stop is recorded in 131R. When this is the case, 141f1 is energised. During IPC which follows, the state of 141F is examined and, when 141f1 is energised G1210 and G1211 open and 121f4 is energised. The same control combination opens G910 and G911 to energise 91f3; this causes 91f2 to be de-energised and so could be used to remove the signal given to the operator when the first line was due to be presented. The following PC opens G1409 and G1410 restoring 141F to 141f2 energised.

So that the operator will know that the first line has been received in toto, it is preferable to transmit the full stop to the operator's printer thereby showing that all destinations have been recorded. This transmission takes place as for previous characters, described above, 132f1 being energised by the same PC pulse as carries out the examination of the contents of 131R. When the full stop character has been transmitted to the operator, all equipment individual to this operator will be back to the original condition and the operator may now deal with the information as described elsewhere (in Wright et al. 174–26–26), although 121C and 122C, the operator's track selector will be set to the track from which information has just been taken. However, 131f1 prevents further information passing to this operator and 133f1 and 133f2 prevent further changes to the distributor elements. Regarding the distributor elements, at this stage the one following the first line will be "1." This is of no consequence for, when the message is transferred to the outgoing line track, this "1" can be removed and a new "1" inserted at the beginning of the message.

In this connection, however, it is to be noted that, instead of the first line only, the whole message might be produced before the operator, in perforated paper tape, for example, for disposal by any well-known tape relay (or torn tape) system of teleprinter switching, although this would not be an ideal solution, or an economic one, having regard to the high cross-office transfer speed effected up to that point.

*Modifications for use of a link arrangement in place of the track selector*

Earlier in this portion of the description, it was stated that a link arrangement common to all operators could be used in place of the individual operator's track selectors. With such a system, it would be necessary to ensure that the operator had received the first line before search began for the next booking.

In the link arrangement 121F, 121C and 122C would be a common circuit and so it would be unnecessary to have the selector commoning shown on Fig. 15. The output from G1505 would separate into as many branches as there are operators, each branch being controlled by an output of 101C. This extra control could be added to the G1506 of each of the branches leading to the operator's equipment. This link arrangement would be very similar to that used in transferring a message from a line track to a common storage track and vice versa. The other change necessary would be to prevent 101F from returning to 101f9 energised until the first line had been read to the operator dealing with the particular booking. This could be carried out quite simply by using a further control combination on G1026 consisting of the 121f4 controls of all operator circuits in an "or" gate arrangement. This could mean that 101f8 remained energised for longer than one interval between WQ but, since this is intended simply to remove the contents of 112R, no false operation could result from this change. A further step to this arrangement would be to make 131R, 131F—133F and 141F part of the common arrangement by branching out to the individual branches after 131R (see Fig. 15) instead of after G1505. This would mean that only 91F and 142F would be individual to an operator. The only change to 142F to make this possible would be to add 101C controls to the gates which control 142F.

As stated, the choice between the individual selector and link arrangement would be dependent upon whether it is better to search for a new booking whilst the first line of a previous booking is passing to an operator or whether the time involved for passing the first line causes no worry and it is possible to wait for this to be completed before the next search begins.

In the claims which follow, it will be realised that the term "store" has been exemplified by a track on a magnetic drum or disc, but other equivalent forms of electronic store as used in computers and the like, e.g. mercury or other delay lines, are equally applicable; further, that the term "an intelligence item" connotes in the description a complete telegraph message.

However, such interpretations are to be regarded as by way of explanation only, and not as limitations on the scope of the claims.

While the principles of the invention have been described above in connection with specific embodiments, and particular modifications thereof, it is to be clearly understood that this description is made only by way of example and not as a limitation on the scope of the invention.

What we claim is:

1. Equipment for storing intelligence comprising a plurality of electrical signal paths over which electrical signals representing items of intelligence are received, a plurality of temporary first electrical signal stores, one for each said signal path, means for storing in each store, temporarily and in turn, electrical signals representing control signals and successive portions of an intelligence item received over its associated signal path, a plurality of main second electrical signal stores each available in common to all said signal paths, a control circuit, means for causing said control circuit to respond to an electrical control signal stored in a first store, and means under the control of said control circuit for sequentially allocating to a first store a plurality of free second stores for the transfer and storage of signals representing successive portions of said intelligence item.

2. Equipment, as claimed in claim 1, in which the intelligence stores can receive and deliver signals representing intelligence items at higher speed than the signalling path, via which intelligence signals are received, can receive such signals, said equipment further comprising an electrical speed changing device connected between said path and said stores and comprising a binary pattern register adapted to receive said intelligence signals in the form of successive signals each of which consists of one of two possible electric signal conditions.

3. Equipment, as claimed in claim 1, in which the control signals comprise signals representing the address of the main second store to be used for storing the signals representing the portion of the intelligence item next succeeding that stored in the temporary first store in question.

4. Equipment, as claimed in claim 3, further comprising means responsive to the temporary store in question being substantially full for allocating another free temporary store, means controlled by the control circuit for storing signals in each temporary store representing the address of the main store to which signals representing a portion of the intelligence were last transferred, and means under control of said last main store address signals for storing in said last main store signals representing the address of said main store now allocated.

5. Equipment, as claimed in claim 4, further comprising means for changing the main store address stored in the temporary store as successive main stores are filled.

6. Equipment, as claimed in claim 4, further comprising supervisory storage means and means for transferring certain signals representing information forming part of each intelligence item from the corresponding temporary store to said supervisory storage means, said transferring means comprising means for recording in said supervisory storage means the address signals of the first main store used for storing signals representing an intelligence item, said address signals and signals representing the supervisory items relating to the same intelligence item being stored therewith.

7. Equipment, as claimed in claim 6, in which the supervisory storage means comprises a number of individual supervisory information stores, and the transferring means comprises means for transferring extracted signals from those representing different intelligence items to different supervisory information stores, means for selecting signals representing supervisory information from different supervisory information stores according to predetermined criteria, and means for extracting signals representing supervisory information from a selected supervisory information store for use in handling said intelligence items.

8. Equipment, as claimed in claim 7, in which the supervisory information comprises a priority number, said equipment further comprising a priority comparator having first and second storing positions and adapted to determine which of the two numbers is the higher, means for extracting signals representing their priority number in turn from the supervisory information stores and transferring said signals to said priority comparator, means for feeding signals representing a first number into said first position of said comparator, means for feeding signals representing the other numbers in turn to said second position, means for comparing the signals in said two positions, and means controlled by said comparing means for transferring the signals in said second position to said first position if the number they represent is higher than that represented by the signals in said first position.

9. Equipment, as claimed in claim 7, further comprising a temporary store in which signals representing supervisory information regarding received intelligence items are accumulated, means for storing signals representing supervisory information in said temporary store, means for transferring signals representing accumulated supervisory information regarding intelligence item to a supervisory store, means for continuously cycling said supervisory information stores relative to common recording and reading means therefor, and means for reading said temporary store in phase with the recording periods of said supervisory information stores in turn, and means for interconnecting the reading means of said temporary store and the recording means of a selected supervisory store when said pair of reading and recording means are in phase.

10. In a telegraph exchange system in which incoming messages are stored and are later retransmitted in an arbitrary order based on a criteria, a plurality of message channels, a message storage means, means for automatically extracting supervisory information from incoming messages received over a message channel and passing said supervisory information to said message storage means, a store, a control circuit for automatically directing such extracted information to said store, and automatic testing equipment for selecting from said store supervisory information for different messages in an order determined by said criteria.

11. Equipment, as claimed in claim 10, in which said message storage means comprises a rotatable drum having a magnetic skin and a number of recording and reading devices arranged to cooperate with parallel peripheral tracks on said skin, said tracks constituting a number of individual stores, means for individually allocating some of said tracks, to incoming message channels, means for maintaining others of said tracks available in common to said incoming message channels, means for allocating in turn any desired number of free common stores for storing successive portions of a single message received by an individual store, and means for automatically transferring successive portions of a message as they in turn fill said individual store to said free common stores allocated in turn thereto.

12. Equipment, as claimed in claim 11, in which an electric pattern-movement register is connected between the message channels and the drum and arranged to regenerate incoming signals and retransmit signals to a drum store at an increased speed suitable for recording on the drum.

13. Equipment, as claimed in claim 11, in which certain of said tracks constitute supervisory information tracks for recording signals representing supervisory information regarding each incoming message, means for selecting signals representing recorded supervisory information according to predetermined criteria, and means for extracting selected records of signals representing supervisory information for use in handling outgoing transmission of recorded messages.

14. Equipment for determining the highest number of a plurality of numbers, represented by electrical signals, comprising a comparator adapted to determine which of two numbers represented by electrical signals is the higher, means for transferring signals representing a first number to a first position in said comparator, means for transferring in turn signals representing the other numbers of said plurality to a second position in said comparator, means for comparing the signals in said two positions, and means for transferring signals from said second position to said first position if comparison determines that the number represented thereby is higher than the number represented by the signals in said first position.

References Cited in the file of this patent

UNITED STATES PATENTS

| | | |
|---|---|---|
| 2,540,654 | Cohen | Feb. 6, 1951 |
| 2,546,630 | Currie et al. | Mar. 27, 1951 |
| 2,614,169 | Cohen et al. | Oct. 14, 1952 |
| 2,617,704 | Mallina | Nov. 11, 1952 |
| 2,617,705 | Coombs | Nov. 11, 1952 |
| 2,652,554 | Williams et al. | Sept. 15, 1953 |
| 2,667,533 | Zenner | Jan. 26, 1954 |
| 2,674,733 | Robbins | Apr. 6, 1954 |
| 2,679,638 | Bensky | May 25, 1954 |
| 2,680,239 | Daniels et al. | June 1, 1954 |
| 2,702,380 | Brustman | Feb. 15, 1955 |
| 2,714,626 | Locke | Aug. 2, 1955 |
| 2,733,425 | Williams | Jan. 31, 1956 |
| 2,770,304 | Tholstrup | Nov. 13, 1956 |
| 2,771,595 | Hendrickson | Nov. 20, 1956 |
| 2,818,322 | Blakely | Dec. 31, 1957 |

OTHER REFERENCES

"Design Features of the ERA 1101 Computer," by F. C. Mullaney in Electrical Engineering, November 1952, pages 1015 to 1018.

"Design Features of a Magnetic Drum Storage System," by J. L. Hill in "Association for Computing Machinery Conference," March 1950.